US009463429B2

(12) United States Patent
Nakamura et al.

(10) Patent No.: US 9,463,429 B2
(45) Date of Patent: Oct. 11, 2016

(54) DEVICE FOR PRODUCING NANOCARBON

(71) Applicants: THE JAPAN STEEL WORKS, LTD., Tokyo (JP); National University Corporation Kitami Institute of Technology, Kitami-shi, Hokkaido (JP)

(72) Inventors: Satoru Nakamura, Muroran (JP); Akio Tada, Kitami (JP)

(73) Assignees: THE JAPAN STEEL WORKS, LTD., Tokyo (JP); National University Corporation Kitami Institute of Technology, Hokkaido (JP)

( * ) Notice: Subject to any disclaimer, the term of this patent is extended or adjusted under 35 U.S.C. 154(b) by 0 days.

(21) Appl. No.: 14/620,069

(22) Filed: Feb. 11, 2015

(65) Prior Publication Data

US 2015/0158001 A1 Jun. 11, 2015

Related U.S. Application Data

(62) Division of application No. 14/115,202, filed as application No. PCT/JP2012/062033 on May 10, 2012.

(30) Foreign Application Priority Data

May 10, 2011 (JP) .................... 2011-105267

(51) Int. Cl.
*B01J 8/24* (2006.01)
*C01B 31/02* (2006.01)
(Continued)

(52) U.S. Cl.
CPC .............. *B01J 8/24* (2013.01); *B01J 8/0045* (2013.01); *B01J 8/0055* (2013.01); *B01J 8/1818* (2013.01);
(Continued)

(58) Field of Classification Search
CPC ........ B01J 8/24; B01J 8/0045; B01J 8/0055; B01J 8/1818; B01J 8/1827; B01J 8/26

USPC ......................................... 422/211
See application file for complete search history.

(56) References Cited

U.S. PATENT DOCUMENTS 2,564,736 A * 8/1951 Stokes ............... C01B 3/36
252/373
2,623,811 A * 12/1952 Williams ............ C09C 1/50
423/456
(Continued)

FOREIGN PATENT DOCUMENTS

CN 101421447 A 4/2009
JP 2000-95509 A 4/2000
(Continued)

OTHER PUBLICATIONS

International Search Report (PCT/ISA/210), dated Jul. 3, 2012, issued by the International Searching Authority in counterpart International Patent Application No. PCT/JP2012/062033.
(Continued)

*Primary Examiner* — Huy-Tram Nguyen
(74) *Attorney, Agent, or Firm* — Sughrue Mion, PLLC

(57) ABSTRACT

Using a device for producing nanocarbon, a fluidized bed is formed by supplying a low hydrocarbon and oxygen to a fluid catalyst, and nanocarbon and hydrogen are produced by a decomposition reaction of the low hydrocarbon accompanied by a self-combustion of the low hydrocarbon and the oxygen. The device includes: a fluidized bed reactor for containing the fluid catalyst and for causing the self-combustion thereof while being supplied with the low hydrocarbon and the oxygen; a gas supplying unit connected to the fluidized bed reactor for supplying the low hydrocarbon and the oxygen to the fluidized bed reactor; an exhaust gas path connected to the fluidized bed reactor for exhausting an exhaust gas in the fluidized bed reactor to outside; and a supplying unit connected to the fluidized bed reactor for supplying the fluid catalyst to the fluidized bed reactor.

8 Claims, 7 Drawing Sheets

(51) Int. Cl.

| | |
|---|---|
| *C01B 3/44* | (2006.01) |
| *B82Y 30/00* | (2011.01) |
| *B82Y 40/00* | (2011.01) |
| *B01J 8/18* | (2006.01) |
| *B01J 8/00* | (2006.01) |
| *D01F 9/127* | (2006.01) |
| *D01F 9/133* | (2006.01) |
| *B01J 8/26* | (2006.01) |

(52) U.S. Cl.
CPC ............... *B01J 8/1827* (2013.01); *B01J 8/26* (2013.01); *B82Y 30/00* (2013.01); *B82Y 40/00* (2013.01); *C01B 3/44* (2013.01); *C01B 31/0206* (2013.01); *C01B 31/0226* (2013.01); *C01B 31/0293* (2013.01); *D01F 9/127* (2013.01); *D01F 9/133* (2013.01); *B01J 2208/00504* (2013.01); *B01J 2208/00752* (2013.01); *B01J 2208/00893* (2013.01); *C01B 2203/0261* (2013.01); *C01B 2203/043* (2013.01); *C01B 2203/0405* (2013.01); *C01B 2203/0415* (2013.01); *C01B 2203/0475* (2013.01); *C01B 2203/1047* (2013.01); *C01B 2203/1058* (2013.01); *C01B 2203/1241* (2013.01); *C01B 2203/1247* (2013.01); *C01B 2203/142* (2013.01)

(56) References Cited

U.S. PATENT DOCUMENTS

| | | | | | |
|---|---|---|---|---|---|
| 2,699,836 | A | * | 1/1955 | Barton, Jr. | ............ B01D 53/22 96/10 |
| 3,615,213 | A | * | 10/1971 | Shepherd | ................. C09C 1/50 422/150 |
| 3,861,885 | A | * | 1/1975 | Schora | ..................... C09C 1/56 422/150 |
| 7,335,344 | B2 | * | 2/2008 | Height | ................ B82Y 30/00 423/447.3 |
| 2005/0042162 | A1 | * | 2/2005 | Resasco | ............... B01J 8/0055 423/447.3 |

| | | |
|---|---|---|
| 2006/0257310 | A1 | 11/2006 Tada et al. |
| 2008/0003170 | A1 | 1/2008 Buchholz et al. |
| 2010/0279181 | A1 | 11/2010 Adams, II et al. |

FOREIGN PATENT DOCUMENTS

| | | |
|---|---|---|
| JP | 2003-342840 A | 12/2003 |
| JP | 2004-75457 A | 3/2004 |
| JP | 2004-76196 A | 3/2004 |
| JP | 2005-343726 A | 12/2005 |
| JP | 2010-18498 A | 1/2010 |
| JP | 2010-30887 A | 2/2010 |
| WO | 2010/002025 A1 | 1/2010 |

OTHER PUBLICATIONS

Written Opinion (PCT/ISA/237), dated Jul. 3, 2012, issued by the International Searching Authority in counterpart International Patent Application No. PCT/JP2012/062033.

Ji, et al.; "A Study of Carbon Deposition on Catalysts During the Catalytic Partial Oxidation of Methane to Syngas in a Fluidized Bed", React. Kinet. Catal. Lett., Mar. 30, 2001, vol. 73, No. 1, pp. 27-32.

Ozdemir, et al.; "Preparation and Characterization of Ni Based Catalysts for the Catalytic Partial Oxidation of Methane: Effect of Support Basicity on H 2/C0 Ratio and Carbon Deposition", International Journal of Hydrogen Energy, Sep. 21, 2010, vol. 35, No. 22, pp. 1 21 47-1 21 60.

Muradov, "Thermocatalytic CO 2-Free Production of Hydrogen from Hydrocarbon Fuels", Proceedings of the 2000 Hydrogen Program Review, Jan. 2000, 30 pages total.

Ruckenstein, et al.; "Role of Support in CO 2 Reforming of CH 4 to Syngas over Ni Catalysts", Journal of Catalysis, vol. 162, No. 2, pp. 230-238.

Search Report dated Oct. 9, 2014, issued by the European Patent Office in counterpart European Application No. 12782697.2.

Machine translation of JP 2004-075457, Mar. 11, 2004, Mitsubishi Heavy Ind. Ltd.

Communication, Issued by the State Intellectual Property Office of P.R. China, Dated Nov. 3, 2014, in counterpart Chinese application No. 201280022829.0.

* cited by examiner

DEVICE FOR PRODUCING NANOCARBON

CROSS REFERENCE TO RELATED APPLICATIONS

This application is divisional of application Ser. No. 14/115,202 filed on Nov. 1, 2013, which is a National Stage of International Application No. PCT/JP2012/062033 filed on May 10, 2012, which claims priority from Japanese Patent Application No. 2011-105267, filed on May 10, 2011, the contents of all of which are incorporated herein by reference in their entirety.

TECHNICAL FIELD

This invention relates to a production method and a production device of nanocarbon, in which nanocarbon and hydrogen are produced by decomposing a low hydrocarbon using a fluid catalyst or a fluid catalyst used in combination with a fluid medium.

BACKGROUND ART

Nanocarbon such as carbon nanofiber, carbon nanotube or onion-like carbon has functions such as a high conductive property and an excellent electromagnetic wave absorption property, and is expected to be applied in various fields.

As the methods for producing nanocarbon using a low hydrocarbon as a raw material, for example, production methods by arc discharge method, by CVD (Chemical Vapor Deposition) method, by a method using a fluidized bed reactor and the like have been known. The production method by arc discharge method is disclosed in PTL 1, for example. The production method by CVD method is disclosed in PTLs 2 and 3, for example. The production method using a fluidized bed reactor is disclosed in PTL 4, for example.

FIG. 7 is a schematic drawing showing the device for producing carbon nanotube by arc discharge method disclosed in PTL 1. As shown in the drawing, an upper flange 101, a lower flange 102, a front flange 103 and a back flange 104 are attached to a reaction vessel (a vacuum chamber) 100. In the reaction vessel 100, a bar negative electrode 105 as a carbon electrode and a bar electrode for producing carbon nanotube (positive electrode) 106, which contains carbon and a non-magnetic transition metal, are placed facing each other. The positive electrode 106 is placed with a constant distance from the negative electrode 105 by an advancing and retreating structure 107. The negative electrode 105 is connected to a cathode terminal 108, and the positive electrode 106 is connected to an anode terminal 109. These cathode terminal 108 and anode terminal 109 are connected to a direct-current power supply (not described in the drawing).

In the production device by arc discharge method shown in FIG. 7, arc discharge is caused between the positive electrode 106 and the negative electrode 105 in the reaction vessel 100 replaced with helium gas. From this, the tip of the positive electrode 106 evaporates, and spray-like fine particles of carbon steam and the non-magnetic transition metal generate. Thus generated spray-like fine particles cohere and precipitate/accumulate, and thus a single layer carbon nanotube accumulates, for example on the outer surface around the root of the negative electrode 105.

Further, FIG. 8 is a schematic drawing showing a device for synthesizing carbon nanotube by CVD method (a horizontal electric furnace) disclosed in PTL 2. As shown in the drawing, around a reaction tube 200, an electric heater 201 for heating the reaction tube 200 is placed. In the reaction tube 200, a base plate containing an iron salt 202 is placed as the main catalyst, and a base plate containing a molybdate 203 is placed as the co-catalyst.

In the production device by CVD method shown in FIG. 8, the inside of the reaction tube 200 is heated to a certain temperature. Then, a carbon source such as methane gas is fed in the reaction tube 200 with an inert gas such as argon gas and is reacted at a certain temperature, and thus carbon nanotube is vapor-deposited.

Furthermore, FIG. 9 is a schematic drawing showing the device for producing fiber nanocarbon using a fluidized bed reactor disclosed in PTL 4. As shown in the drawing, the device for producing fiber nanocarbon has: a fluidized bed reactor 301 having a heating unit 300 for heating the inside; a first gas supplying unit 303 for supplying a reductive gas 302 to the fluidized bed reactor 301; a carbon material supplying unit 305 for supplying a carbon material 304 in the fluidized bed reactor 301 in a gas state; a second gas supplying unit 307 for supplying an inert gas including no carbon 306 to the fluidized bed reactor 301; and an exhaust line 309 for exhausting from the fluidized bed reactor 301 a scattering particle 308 including gas G and the fiber nanocarbon obtained. The fluidized bed reactor 301 is composed of a fluidized bed part 301A for forming the fluidized bed, and a free board part 301B on the fluidized bed part 301A in a state that it is connected to the fluidized bed part 301A. Furthermore, the fluidized bed reactor 301 is filled with a catalyst fluid material 310, to which a carrier supporting a catalyst is bound through a binder. In addition, a particle collecting unit 311 for collecting the particles is connected to the exhaust line 309.

In the production device shown in FIG. 9, the reductive gas 302 is supplied to the fluidized bed reactor 301 by the first gas supplying unit 303 and the form of the catalyst is made into metal. Next, the carbon material 304 is supplied to the fluidized bed reactor 301 in a gas state by the carbon material supplying unit 305, and fiber nanocarbon is deposited on the catalyst at a certain reaction temperature. Then, by raising the temperature inside the fluidized bed reactor 301 higher than the reaction temperature by the heating unit 300, the binder forming the catalyst fluid material 310 is pulverized by thermal decomposition or the like, and the function as a fluid material is lost. The material, which has lost the fluidity function, becomes an aggregate of carriers or a bound body thereof, and is pulverized. Then, it is exhausted with the gas G outside from the free board part 301B of the fluidized bed reactor 301 through the exhaust line 309 as the scattering particle 308. The scattering particle 308 exhausted is collected by the particle collecting unit 311. Fiber nanocarbon is separated from the thus collected scattering particle 308.

CITATION LIST

Patent Literature

PTL 1: JP-A-2000-95509
PTL 2: JP-A-2005-343726
PTL 3: JP-A-2010-18498
PTL 4: JP-A-2003-342840

SUMMARY OF THE INVENTION

Technical Problem

However, the above-described related-art methods for producing nanocarbon have problems that a large amount of energy such as electricity or heat is necessary in order to produce nanocarbon. That is, in the production method by arc discharge method, a large amount of electricity is necessary to cause arc discharge between the electrodes. Further, in the production method by CVD method and the production method using a fluidized bed reactor, it is necessary to provide a large amount of energy from outside to raise the temperature in the reaction tube or the fluidized bed reactor, in which nanocarbon is produced, to a certain reaction temperature. It is not preferable in view of the combustion to use a fuel for providing heat, because a large amount of carbon dioxide generates by the combustion of the fuel.

Furthermore, in the related-art methods for producing nanocarbon, the nanocarbon produced is expensive, because a large amount of energy is necessary and it is also difficult to mass-produce the nanocarbon. Accordingly, there is a problem the commercialization is difficult with the nanocarbon produced by the related-art production methods.

Here, when nanocarbon is produced by the contact thermal decomposition of a low hydrocarbon, not only the nanocarbon as the objective substance is obtained, but also amorphous carbon is sometimes precipitated on the catalyst. When amorphous carbon is precipitated on the catalyst, the activity of the catalyst deteriorates, and as a result the production efficiency of nanocarbon deteriorates. It is thought that such amorphous carbon is precipitated by the non-contact thermal decomposition or the radical reaction of the low hydrocarbon in the gas phase, or by the side reaction on the contact surface of the low hydrocarbon and the catalyst.

In the related-art methods for producing nanocarbon by the contact thermal decomposition, it is difficult to sufficiently prevent the above-described amorphous carbon from precipitating. Therefore, there are problems that the production efficiency of nanocarbon deteriorates and the reliability and the durability of the production device deteriorate.

This invention was made with the above-described circumstances as the background; and aims to provide a production method and a production device of nanocarbon, which keeps the amount of energy necessary for the production low, enables the mass-production of nanocarbon and can reduce the amount of carbon dioxide generated.

In addition, this invention aims to provide a production method and a production device of nanocarbon, which: prevents the precipitation of amorphous carbon, which deteriorates the activity of the catalyst during the contact thermal decomposition of the low hydrocarbon; enables the effective mass-production of nanocarbon; and can reduce the amount of carbon dioxide generated.

Solution to Problem

That is, according to a first aspect of the invention, a method for producing nanocarbon comprises: forming a fluidized bed by supplying a low hydrocarbon and oxygen to a fluid catalyst or a fluid catalyst used in combination with a fluid medium; and producing nanocarbon and hydrogen by a decomposition reaction of the low hydrocarbon accompanied by a self-combustion of the low hydrocarbon and the oxygen.

According to a second aspect of the invention, in the method for producing nanocarbon according to the first aspect, wherein the oxygen in the low hydrocarbon and the oxygen is supplied in a ratio of 25% by volume or less.

According to a third aspect of the invention, in the method for producing nanocarbon according to the first or second aspect, wherein an amount of carbon dioxide included in an exhaust gas from the decomposition reaction is 10% by volume or less, and an amount of water included in the exhaust gas from the decomposition reaction is 20% by volume or less.

According to a fourth aspect of the invention, in the method for producing nanocarbon according to any one of the first to third aspects, wherein the fluid catalyst comprises: a fluid catalyst including a silica carrier of 1 μm to 200 μm and a nickel fine particle in an amount of 50% by mass or less relative to the carrier; or a fluid catalyst including an alumina carrier of 1 μm to 200 μm and an iron fine particle in an amount of 50% by mass or less relative to the carrier.

According to a fifth aspect of the invention, in the method for producing nanocarbon according to any one of the first to fourth aspects, wherein a fluid medium comprising one or two or more selected from a sand particle, a silica particle and an alumina particle of 200 μm or less is added to the fluid catalyst, and the fluidized bed is formed with the fluid catalyst.

According to a sixth aspect of the invention, in the method for producing nanocarbon according to any one of the first to fifth aspects, wherein temperature of the decomposition reaction is 500° C. to 1000° C.

According to a seventh aspect of the invention, in the method for producing nanocarbon according to any one of the first to sixth aspects, wherein a pressure of the decomposition reaction is 10 atmospheres or less.

According to an eighth aspect of the invention, in the method for producing nanocarbon according to any one of the first to seventh aspects, wherein the low hydrocarbon is supplied to the fluid catalyst or the fluid catalyst used in combination with the fluid medium under a condition that the SV value is 80,000 NL/kg-catal./h or less in the methane conversion.

According to a ninth aspect of the invention, in the method for producing nanocarbon according to any one of the first to eighth aspects, wherein an unreacted low hydrocarbon included in the exhaust gas from the decomposition reaction is refluxed and supplied to the decomposition reaction.

According to a tenth aspect of the invention, in the method for producing nanocarbon according to any one of the first to ninth aspects, wherein the decomposition reaction is set as a first stage, wherein the exhaust gas from the decomposition reaction and oxygen having a concentration lower than the oxygen supplied in the first stage are supplied to a fluid catalyst or a fluid catalyst used in combination with a fluid medium of a second stage so as to form the fluidized bed, and wherein the unreacted low hydrocarbon included in the exhaust gas is decomposed accompanied by the self-combustion of the exhaust gas and the oxygen so as to further produce the nanocarbon and the hydrogen.

According to an eleventh aspect of the invention, in the method for producing nanocarbon according to any one of the first to tenth aspects, wherein the nanocarbon produced by the decomposition reaction has a diameter of 1 μm to 500 nm and a length of 100 μm or less.

According to a twelfth aspect of the invention, there is provided a device for producing nanocarbon, comprising; a fluidized bed reactor configured to contain therein a fluid catalyst or a fluid catalyst used in combination with a fluid medium and to cause therein a self-combustion of a low hydrocarbon and oxygen while being supplied with the low hydrocarbon and the oxygen; a gas supplying unit connected to the fluidized bed reactor and configured to supply the low hydrocarbon and the oxygen to the fluidized bed reactor; an exhaust gas path connected to the fluidized bed reactor and configured to exhaust an exhaust gas in the fluidized bed reactor to outside, and a supplying unit connected to the fluidized bed reactor and configured to supply the fluid catalyst or the fluid catalyst used in combination with the fluid medium to the fluidized bed reactor.

According to a thirteenth aspect of the invention, the device for producing nanocarbon according to the twelfth aspect further comprises: a gas refluxing path configured to reflux the unreacted low hydrocarbon included in the exhaust gas exhausted from the fluidized bed reactor so as to be supplied to the decomposition reaction.

According to a fourteenth aspect of the invention, the device for producing nanocarbon according to the thirteenth aspect further comprises: a hydrogen separation unit configured to separate the hydrogen from the exhaust gas, wherein the gas refluxing path is connected to the hydrogen separation unit at a side for exhausting the exhaust gas separated from hydrogen.

According to a fifteenth aspect of the invention, the device for producing nanocarbon according to the fourteenth aspect further comprises: a carbon dioxide separation unit configured to separate carbon dioxide at a downstream of the side for exhausting the exhaust gas separated from hydrogen of the hydrogen separation unit, wherein the gas refluxing path is connected to the carbon dioxide separation unit at a side for exhausting the exhaust gas separated from carbon dioxide.

According to a sixteenth aspect of the invention, the device for producing nanocarbon according to the fifteenth aspect further comprises: a water separation unit configured to separate water at a downstream of a side for exhausting the exhaust gas separated from carbon dioxide of the carbon dioxide separation unit, wherein the gas refluxing path is connected to the water separation unit at a side for exhausting the exhaust gas separated from water.

According to a seventeenth aspect of the invention, the device for producing nanocarbon according to any one of the twelfth to sixteenth aspects further comprises: a second fluidized bed reactor at a second stage of the fluidized bed reactor, wherein the second fluidized bed reactor is configured to contain therein a fluid catalyst or a fluid catalyst used in combination with a fluid medium and is configured to cause therein the self-combustion by being supplied with the exhaust gas from the fluidized bed reactor and oxygen; a second gas supplying unit connected to the second fluidized bed reactor and configured to supply the exhaust gas and oxygen to the second fluidized bed reactor; a second exhaust gas path connected to the second fluidized bed reactor and configured to exhaust an exhaust gas in the second fluidized bed reactor to outside; and a second supplying unit connected to the second fluidized bed reactor and configured to supply the fluid catalyst or the fluid catalyst used in combination with the fluid medium to the second fluidized bed reactor.

According to an eighteenth aspect of the invention, the device for producing nanocarbon according to any one of the twelfth to seventeenth aspects further comprises: a screw feeder configured to transfer a mixture of: one or two or more of the fluid catalyst or the fluid medium contained in the fluidized bed reactor; a catalyst served to the decomposition reaction and including the nanocarbon; and a catalyst obtained by pretreating the catalyst served to the decomposition reaction and including the nanocarbon to remove at least the nanocarbon.

According to a nineteenth aspect of the invention, the device for producing nanocarbon according to any one of the twelfth to eighteenth aspects comprises: the fluidized bed reactor; and a screw feeder moving reaction bed for conducting the decomposition reaction while feeding the fluid catalyst.

Advantageous Effects of Invention

That is, according to this invention, since the fluidized bed is formed by supplying a low hydrocarbon and oxygen to a fluid catalyst or a fluid catalyst used in combination with a fluid medium, the decomposition reaction of the low hydrocarbon accompanied by the self-combustion of the low hydrocarbon and the oxygen occurs, and nanocarbon and hydrogen are produced. Through the self-combustion of the low hydrocarbon and the oxygen, a part of or all the energy necessary for the decomposition reaction of the low hydrocarbon is supplied. Therefore, the energy necessary for the nanocarbon production is kept low.

In addition, the carbon dioxide and the water, which have been generated through the decomposition reaction of the low hydrocarbon accompanied by the self-combustion of the low hydrocarbon and the oxygen, are fed into the fluidized bed as oxidized gases, and the hydrogen and the carbon monoxide are fed into the fluidized bed as reducing gases. Thus, amorphous carbon is prevented from precipitating on the fluid catalyst in the fluidized bed. Accordingly, the deterioration of the fluid catalyst activity is prevented, and nanocarbon is mass-produced effectively.

DESCRIPTION OF EMBODIMENTS

Figure 1:
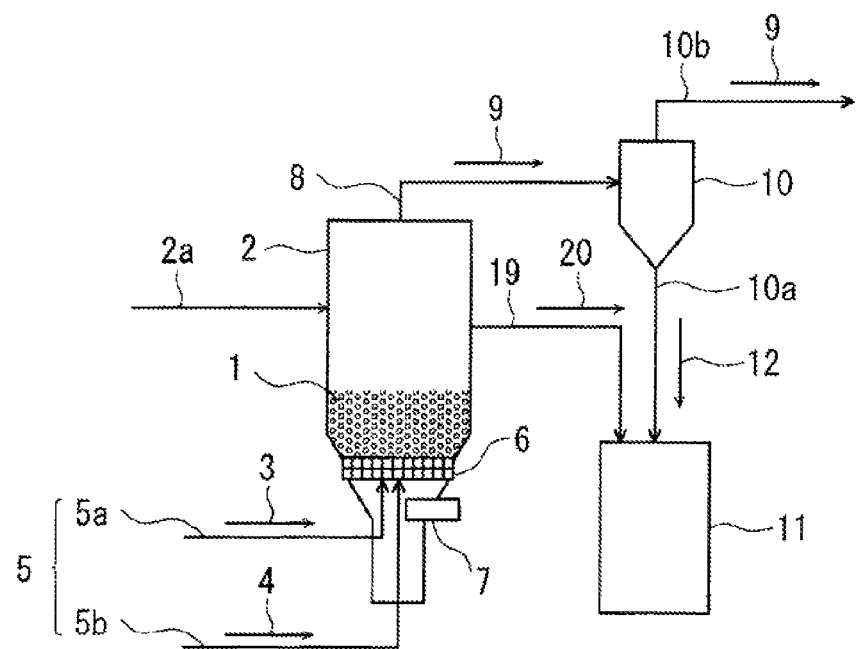
FIG. 1 is a schematic drawing showing a device for producing nanocarbon of an embodiment of this invention.

Incidentally, a representative example of the low hydrocarbon used in this invention is methane, and other examples thereof are ethane, propane and butane. The low hydrocarbon may be a single kind or a mixture of several kinds. A low hydrocarbon included in natural gas, city gas 13A, boil off gas, biogas or the like can be used.

In addition, the fluid catalyst used in this invention is not limited to a specific catalyst type, as long as it can be used for decomposing the low hydrocarbon. Representatively, metals such as nickel and iron are mentioned as the fluid catalyst, and those, in which these metal fine particles are supported on the surface of a carrier such as a silica carrier or an alumina carrier, are mentioned. Specific examples are a fluid catalyst in which 50% by mass or less of a nickel fine particle of 1 to 500 nm is supported on a silica carrier of 1 to 200 µm, and a fluid catalyst in which 50% by mass or less of an iron fine particle of 1 to 500 nm is supported on an alumina carrier of 1 to 200 µm. The reason why the amount of the catalyst metal fine particle is preferably 50% by mass or less relative to the carrier is that the metal sinters resulting in the large crystal diameter and thus nanocarbon is not produced, when the amount of the catalyst metal fine particle is too high. Further, it is industrially difficult and it costs a lot to make the amount of the catalyst metal fine particle more than 50% by mass relative to the carrier. Incidentally, the amount of the catalyst metal fine particle is preferably 1 to 50% by mass relative to the carrier, in view of effectively advancing the decomposition reaction of the low hydrocarbon. In addition, fluidity appropriate for forming the fluidized bed can be achieved, when the size of the catalyst metal fine particle is 1 to 500 nm.

Furthermore, the fluid catalyst may be provided in a seed state bound with nanocarbon, without being supported on the above-described carrier.

To the above-described fluid catalyst, a fluid medium forming the fluidized bed with the fluid catalyst may be added and used in combination. By adding the fluid medium, the fluidity improves, and it is possible to form a fluidized bed in which the decomposition reaction of the low hydrocarbon progresses effectively. Examples of the fluid medium are sand particles, silica particles and alumina particles, and the fluid medium may be a kind thereof or a mixture of two or more kinds. Incidentally, the average particle diameter of the fluid medium is preferably 200 µm or less, more preferably 100 to 200 µm and further preferably 100 to 150 µm. When the average particle diameter of the fluid catalyst is in the above-described range, a fluidized bed in which the decomposition reaction of the low hydrocarbon progresses effectively is formed.

In addition, in the low hydrocarbon and the oxygen supplied to the fluid catalyst or the fluid catalyst used in combination with the fluid medium, the oxygen ratio is preferably 25% by volume or less in the case of converting the low hydrocarbon to methane, and more preferably 5 to 25% by volume. When the oxygen ratio is less than 5% by volume, the reaction temperature becomes lower than the determined value due to the insufficient heat supply, and there is a possibility that the decomposition reaction of the low hydrocarbon accompanied by the self-combustion of the low hydrocarbon and the oxygen does not progress sufficiently. Further, when the oxygen ratio exceeds 25% by volume, carbon dioxide associated with the combustion of the low hydrocarbon is generated excessively, and the production efficiency of nanocarbon deteriorates. Accordingly, the concentration of the oxygen included in the gas supplied to the fluid catalyst or the fluid catalyst used in combination with the fluid medium is more preferably in the above-described range.

Furthermore, to the fluid catalyst or the fluid catalyst used in combination with the fluid medium, it is preferable to supply the low hydrocarbon with a certain flow rate under a condition that the SV value is 80,000 NL/kg-catal./h or less in the methane conversion, and it is more preferable to supply the low hydrocarbon under a condition that the SV value is 40,000 to 80,000 NL/kg-catal./h. When the SV value is less than 40,000 NL/kg-catal./h, a sufficient fluidized state cannot be achieved. Further, when the SV value exceeds 80,000 NL/kg-catal./h, the inversion rate decreases and the reaction efficiency deteriorates. Accordingly, the SV value for supplying the low hydrocarbon to the fluid catalyst or the fluid catalyst used in combination with the fluid medium is more preferably in the above-described range.

Incidentally, the embodiment for supplying the low hydrocarbon and the oxygen to the fluid catalyst or the fluid catalyst used in combination with the fluid medium is not particularly limited, as long as it is an embodiment which can form the fluidized bed. For example, the embodiment may be an embodiment for supplying a mixed gas of the low hydrocarbon and oxygen to the fluid catalyst or the fluid catalyst used in combination with the fluid medium, or an embodiment for supplying the low hydrocarbon and oxygen separately and independently to the fluid catalyst or the fluid catalyst used in combination with the fluid medium and mixing them in the fluidized bed. In order to achieve efficient combustion, the former embodiment for supplying a mixed gas to the fluid catalyst or the fluid catalyst used in combination with the fluid medium is preferable.

In addition, the temperature of the gas including the low hydrocarbon and oxygen to be supplied to the fluid catalyst or the fluid catalyst used in combination with the fluid medium is preferably a temperature at which the low hydrocarbon and the oxygen self-combust easily, and specifically, the temperature is preferably 400 to 500° C. By controlling the temperature of the gas to be supplied to the fluid catalyst or the fluid catalyst used in combination with the fluid medium 400 to 500° C., the low hydrocarbon and the oxygen, which have been supplied to the fluid catalyst or the fluid catalyst used in combination with the fluid medium, self-combust immediately. Accordingly, it is not necessary to supply a large amount of heat from outside and the energy necessary for the nanocarbon production can be kept low. In addition, it is possible to set the reaction temperature in the fluidized bed to an appropriate temperature easily.

Regarding the decomposition reaction of the low hydrocarbon accompanied by the self-combustion of the low hydrocarbon and the oxygen, the temperature of the decomposition reaction is preferably controlled to 500 to 1000° C., more preferably to 500 to 900° C., by appropriately setting the reaction conditions. From this, the decomposition of the low hydrocarbon and the self-combustion due to the reaction between the low hydrocarbon and the oxygen become efficient. The temperature of the decomposition reaction can be set by adjusting the ratio, temperature and flow rate of each gas to be supplied to the fluid catalyst or the fluid catalyst used in combination with the fluid medium, or by adjusting the pressure of the fluidized bed and the like. Further, although it is not always necessary to supply heat to the fluidized bed from outside by a heating unit such as a heater, it is also acceptable to supply heat to the fluidized bed from outside by a heating unit.

Furthermore, the pressure of the decomposition reaction is preferably set to 10 atmospheres or less. This is because, when the pressure of the fluidized bed exceeds 10 atmospheres, the cost increases and the production efficiency of nanocarbon and hydrogen by the decomposition of the low hydrocarbon deteriorates under a high pressure in view of chemical equilibration, resulting in a disadvantage for the reaction. Incidentally, the pressure of the decomposition reaction is preferably 3 atmospheres or more, in view of improving the separation efficiency in case of providing a hydrogen permeable membrane at the reactor exit and separating hydrogen from the exit gas.

Unreacted low hydrocarbon, hydrogen, carbon dioxide, carbon monoxide and water are included in the exhaust gas in the decomposition reaction of the low hydrocarbon accompanied by the self-combustion of the low hydrocarbon and the oxygen. The concentration of the carbon dioxide included in the exhaust gas is preferably 10% by volume or less and more preferably 1 to 10% by volume. This is because the concentration of the carbon dioxide in the exhaust gas of less than 1% by volume means that the amount of the carbon dioxide generated by the self-combustion is too low, and it is not possible to achieve a sufficient effect to prevent the precipitation of amorphous carbon that leads the deterioration of the fluid catalyst activity. Further, when the concentration exceeds 10% by volume, the production amount of nanocarbon is limited, and the production amount of nanocarbon reduces. In addition, the concentration of the water included in the exhaust gas is preferably 20% by volume or less, and more preferably 1 to 20% by volume. This is because it is not possible to achieve a sufficient effect to prevent the precipitation of amorphous carbon that leads the deterioration of the fluid catalyst activity, when the concentration of the water included in the exhaust gas is less than 1% by volume. Further, when the concentration of the water exceeds 20% by volume, the amount of carbon dioxide generated increases by the progress of the steam-reforming reaction of methane, the production amount of nanocarbon decreases, and the production of nanocarbon becomes difficult. Furthermore, when the water amount is high, the heat absorption due to the evaporative latent heat and the reaction heat of the water become large and thus the energy consumption increases. Accordingly, the water concentration is preferably 20% by volume or less.

Furthermore, the unreacted low hydrocarbon included in the exhaust gas is preferably supplied to the decomposition reaction after refluxing it. From this, the loss of the low hydrocarbon serving as the raw material of nanocarbon is reduced, and nanocarbon can be produced in a high yield.

Incidentally, the reflux gas, which includes the unreacted low hydrocarbon and in which the temperature has been lowered through the separation processes described below, may be heated to a certain temperature by the heat exchange through a heat exchanger with the exhaust gas, which has a high temperature due to the decomposition reaction. For example, by the heat exchange with the exhaust gas at 500 to 800° C., the reflux gas can be heated to 400 to 500° C. Through the heat exchange between the reflux gas and the exhaust gas, nanocarbon and hydrogen can be produced with an excellent thermal efficiency.

Further, when the unreacted low hydrocarbon is refluxed, it is preferable to separate the hydrogen gas from the exhaust gas and then supply the gas to the decomposition reaction as the reflux gas. It is more preferable to separate carbon dioxide from the exhaust gas, which has been separated from hydrogen, and then supply the gas to the decomposition reaction. It is further preferable to separate water from the exhaust gas, which has been separated from carbon dioxide, and then supply the gas to the decomposition reaction. By removing carbon dioxide and water, which prevent the decomposition of the low hydrocarbon and the self-combustion of the low hydrocarbon and oxygen, from the exhaust gas to be refluxed and supplied to the decomposition reaction, the reaction efficiency can be improved.

In addition, the decomposition reaction of the low hydrocarbon using the fluid catalyst may be divided into two stages (a first stage and a second stage), and the exhaust gas from the first stage decomposition reaction accompanied by the self-combustion of the low hydrocarbon and oxygen may be supplied to the second stage decomposition reaction. That is, the exhaust gas from the first stage decomposition reaction and oxygen are supplied to the fluid catalyst or the fluid catalyst used in combination with the fluid medium of the second stage to form the fluidized bed, and the unreacted low hydrocarbon included in the exhaust gas from the first stage is decomposed accompanied by the self-combustion of the exhaust gas of the first stage and oxygen with a low concentration. Incidentally, the ratio of the oxygen to be supplied to the fluid catalyst or the fluid catalyst used in combination with the fluid medium of the second stage is preferably lower than that of the oxygen to be supplied to the fluid catalyst or the fluid catalyst used in combination with the fluid medium of the first stage. Specifically, the ratio is preferably 10% by volume or less, and more preferably 2 to 10% by volume. This is because the unreacted low hydrocarbon to be supplied to the fluid catalyst or the fluid catalyst used in combination with the fluid medium of the second stage has a concentration lower than that of the low hydrocarbon to be supplied to the fluid catalyst or the fluid catalyst used in combination with the fluid medium of the first stage, and it is thus preferable to make the ratio of the oxygen to be supplied to the second stage lower. The unreacted low hydrocarbon included in the exhaust gas from the first stage is decomposed through the second stage decomposition reaction, and carbon and hydrogen are further produced.

By dividing the decomposition reaction of the low hydrocarbon into the two stages of the first stage and the second stage, there is an advantage that the kind and the amount of the catalyst and the reaction temperature in each stage can be controlled independently. Thus, the throughput of the low hydrocarbon can be increased.

The above-described decomposition reaction is not limited to the two stages of the first stage and the second stage, and the decomposition reaction may be constituted by three stages or more. Further, a part of the unreacted low hydrocarbon exhausted from each stage, or a part of or all the unreacted low hydrocarbon in the final stage may be provided to the decomposition reaction of the same stage or other stages.

As the reactor for producing the nanocarbon, a fluidized bed reactor, which can contain the fluid catalyst or the fluid catalyst used in combination with the fluid medium and in which the low hydrocarbon and oxygen can be supplied and can self-combust, can be used. To the fluidized bed reactor, a gas supplying unit for supplying the low hydrocarbon and oxygen to the fluidized bed reactor is connected to provide a structure that can supply the both gasses, and an exhaust gas path for exhausting the exhaust gas in the fluidized bed reactor outside is connected to provide a structure that can exhaust the exhaust gas.

The gas supplying unit can supply the low hydrocarbon and oxygen to the fluidized bed reactor from one or more of lower, middle and upper parts of the fluidized bed reactor. Further, the gas supplying unit may supply the low hydrocarbon and oxygen to the fluidized bed reactor intermittently, or may supply them continuously.

Incidentally, when the low hydrocarbon and oxygen are supplied from the lower part of the fluidized bed reactor, the fluid catalyst or the fluid catalyst used in combination with the fluid medium contained in the fluidized bed reactor can be supported by a dispersing plate placed at a lower part of the fluidized bed reactor. The gas supplying unit supplies the low hydrocarbon and oxygen to the fluid catalyst or the fluid catalyst used in combination with the fluid medium from beneath the dispersing plate through the dispersing plate. By supplying the low hydrocarbon and oxygen to the fluid catalyst or the fluid catalyst used in combination with the fluid medium through the dispersing plate, the fluidized bed can be formed stably in the fluidized bed reactor.

Further, when the unreacted low hydrocarbon included in the exhaust gas is refluxed, it is preferable to provide a gas refluxing path which refluxes the unreacted low hydrocarbon exhausted through the exhaust gas path and supplies it to the decomposition reaction. By providing a gas refluxing path, the unreacted low hydrocarbon can be supplied effectively to the decomposition reaction.

In addition, it is preferable to provide a hydrogen separation unit for separating hydrogen from the exhaust gas to the gas refluxing path, and to form a structure in which the gas refluxing path is connected to the hydrogen separation unit at the side for exhausting the exhaust gas separated from hydrogen. The hydrogen separation unit can be constituted by a hydrogen permeable membrane which can be selectively permeated by hydrogen. By providing a hydrogen separation unit, hydrogen can be collected from the exhaust gas. The hydrogen collected may be collected in a collection vessel, or transferred to the next process.

Further, it is preferable to provide a carbon dioxide separation unit for separating carbon dioxide from the exhaust gas to the hydrogen separation unit, and to form a structure in which: the carbon dioxide separation unit for separating carbon dioxide is provided to the hydrogen separation unit at the downstream of the side for exhausting the exhaust gas separated from hydrogen; and a gas refluxing path is connected to the carbon dioxide separation unit at the side for exhausting the exhaust gas separated from carbon dioxide. The carbon dioxide separation unit can be constituted using absorption, adsorption and membrane separation methods. By providing a carbon dioxide separation unit, it is possible to remove carbon dioxide from the exhaust gas to be refluxed and supplied to the decomposition reaction, and prevent excessive carbon dioxide from disturbing the decomposition reaction of the low hydrocarbon and the combustion of the low hydrocarbon and oxygen.

Further, it is preferable to provide a water separation unit for separating water from the exhaust gas to the carbon dioxide separation unit: and form a structure in which; the water separation unit for separating water is provided to the carbon dioxide separation unit at the downstream of the side for exhausting the exhaust gas separated from carbon dioxide; and a gas refluxing path is connected to the water separation unit at the side for exhausting the exhaust gas separated from water. The water separation unit can be constituted by a heat exchanger or the like, which cools the gas by the flow of a cooling medium. By providing a water separation unit, it is possible to remove water from the exhaust gas to be refluxed and supplied to the decomposition reaction, and prevent water from disturbing the decomposition reaction of the low hydrocarbon and the combustion of the low hydrocarbon and oxygen.

Here, the carbon dioxide separation unit and the water separation unit may be provided as a single separation unit having the separation functions of the both separation units, rather than providing the separation units separately and independently. As such a single separation unit, it is possible to constitute a separation unit for separating a gas other than the low hydrocarbon, which includes carbon monoxide, nitrogen and the like in addition to carbon dioxide and water, from the low hydrocarbon, using a low hydrocarbon separation membrane such as a methane separation membrane.

In addition, when the decomposition reaction of the low hydrocarbon using the fluid catalyst is divided into the two stages of the first stage and the second stage and the exhaust gas from the first stage decomposition reaction is supplied to the second stage decomposition reaction, a structure for conducting the decomposition reaction of the unreacted low hydrocarbon included in the first stage exhaust gas may be provided to the second stage. In the second stage, it is possible to use a structure having; a second fluidized bed reactor, which can contain the fluid catalyst or the fluid catalyst used in combination with the fluid medium and in which the exhaust gas from the first stage fluidized bed reactor and oxygen can be supplied and can self-combust, at a stage after the first stage fluidized bed reactor; a second gas supplying unit, which is connected to the second fluidized bed reactor, and which supplies the exhaust gas from the first stage and oxygen to the second fluidized bed reactor; a second exhaust gas path, which is connected to the second fluidized bed reactor, and which exhausts the exhaust gas in the second fluidized bed reactor outside; and a second supplying unit, which is connected to the second fluidized bed reactor, and which supplies the fluid catalyst or the fluid catalyst used in combination with the fluid medium into the second fluidized bed reactor.

Furthermore, it is preferable to provide a screw feeder to the fluidized bed reactor, and to feed through this screw feeder a mixture of one or two or more of the fluid catalyst or the fluid catalyst used in combination with the fluid medium to be contained in the fluidized bed reactor, the catalyst provided to the decomposition reaction and including nanocarbon, and a catalyst which is obtained from the catalyst provided to the decomposition reaction and including nanocarbon by pretreating it to remove at least nanocarbon. During the decomposition reaction in the fluidized bed reactor, the fluid catalyst or the fluid catalyst used in combination with the fluid medium forming the fluidized bed is dispersed and exhausted from the fluidized bed reactor with the exhaust gas. Accordingly, it is preferable to supply the fluid catalyst or the fluid catalyst used in combination with the fluid medium to the fluidized bed reactor, in order to continuously conduct the decomposition reaction. In this regard, by feeding the fluid catalyst or the fluid catalyst used in combination with the fluid medium by the screw feeder, the fluid catalyst or the fluid catalyst used in combination with the fluid medium can be supplied stably and quantitatively to the fluidized bed reactor having a pressure higher than the outside.

Furthermore, it is possible to provide to the fluidized bed reactor a screw feeder moving reaction bed, which conducts the decomposition reaction of the low hydrocarbon while it feeds the fluid catalyst, and which has an external or internal heating mechanism. In this case, a particle, in which nanocarbon and the catalyst metal fine particle are bound to each other, is made into a seed of nanocarbon in the screw feeder moving reaction bed; the seed is fed into the fluidized bed reactor; and the seed can be developed close to the limit over a sufficient time in a large space in the fluidized bed reactor. One of the effects thereof is that the production amount of nanocarbon can be increased remarkably. Another effect is that a seed having a small bulk density can be produced and the seed can be developed to nanocarbon having a small bulk density in the fluidized bed reactor; by controlling the production condition of the particle, in which the nanocarbon and the catalyst metal fine particle are bound to each other, in the screw feeder moving reaction bed. As a result, it is possible to obtain nanocarbon having a bulk density smaller than that of the nanocarbon produced directly in a fluidized bed reactor without providing a screw feeder moving reaction bed. The nanocarbon having a small bulk density always has a high dispersibility, and it becomes easy to remove the catalyst remaining in the nanocarbon; which leads to the characteristic to largely reduce the cost of the dispersion treatment and purification treatment, which are the causes of the high cost of nanocarbon.

The nanocarbon produced by the method for producing nanocarbon of this invention has a diameter of 1 to 500 nm and a length of 100 μm or less, for example. The nanocarbon with such a size moves to the upper bed of the fluidized bed and reaches to the free board part that is the space above the fluidized bed part where the fluidized bed is formed, due to the difference in the bulk gravity and the diameter from the fluid catalyst or the fluid catalyst used in combination with the fluid medium, or due to the volume expansion. By providing a nanocarbon exhaust path to the wall of the fluidized bed reactor, the nanocarbon, which has been reached the free board part, can be overflown from the nanocarbon exhaust path, and collected or transferred to the next process.

As described above, according to this invention, the fluidized bed is formed by supplying the low hydrocarbon and oxygen to the fluid catalyst or the fluid catalyst used in combination with the fluid medium, and nanocarbon and hydrogen are produced by the decomposition reaction of the low hydrocarbon accompanied by the self-combustion of the low hydrocarbon and the oxygen. Accordingly, it is possible to keep the energy necessary for the production low, mass-produce nanocarbon, and avoid a part of or all the fuel consumption thereby preventing the carbon dioxide generation.

In addition, according to this invention, a part of the carbon dioxide generated by the decomposition reaction is supplied to the fluidized bed, and thus, the precipitation of amorphous carbon on the fluid catalyst is prevented during the decomposition reaction. Therefore, according to this invention, the deterioration of the fluid catalyst activity is prevented, nanocarbon can be mass-produced efficiently, and the generation of carbon dioxide is prevented.

Embodiment 1

An embodiment of this invention is explained below based on FIG. 1.

FIG. 1 is a schematic drawing showing a device for producing nanocarbon.

The device for producing nanocarbon has a fluidized bed reactor 2 in which a fluid catalyst or a fluid catalyst used in combination with a fluid medium 1 is contained, and a gas supplying path 5 which supplies a low hydrocarbon 3 and oxygen 4 to the fluidized bed reactor 2 as the reaction gasses.

The gas supplying path 5 comprises a low hydrocarbon supplying path 5a for supplying the low hydrocarbon 3, and an oxygen supplying path 5b for supplying the oxygen 4. A low hydrocarbon source (not described in the drawing) for supplying the low hydrocarbon to the low hydrocarbon supplying path 5a is connected to the upstream edge of the low hydrocarbon supplying path 5a. An oxygen source (not described in the drawing) for supplying oxygen to the oxygen supplying path 5b is connected to the upstream edge of the oxygen supplying path 5b. The low hydrocarbon supplying path 5a and the low hydrocarbon source constitute a low hydrocarbon supplying unit, and the oxygen supplying path 5b and the oxygen source constitute an oxygen supplying unit. These low hydrocarbon supplying unit and oxygen supplying unit correspond to the gas supplying unit of this invention.

A dispersing plate 6 is placed at the lower part of the fluidized bed reactor 2. The fluid catalyst or the fluid catalyst used in combination with the fluid medium 1 contained in the fluidized bed reactor 2 is supported by the dispersing plate 6. The dispersing plate 6 has, for example a porous structure having fine pores connected to each other from up to down, a structure having through-holes passing through from the upper surface to the lower surface, or the like; and a gas passes from the bottom to upwards and disperses at the upper part.

The downstream edge of the low hydrocarbon supplying path 5a and the downstream edge of the oxygen supplying path 5b are connected to the lower part of the fluidized bed reactor 2 at the position below the dispersing plate 6. Further, an ignition device 7 for igniting the mixed gas flowing towards the dispersing plate 6 is attached under the dispersing plate 6.

An exhaust gas path 8 for exhausting the exhaust gas in the fluidized bed reactor 2 is connected to the upper part of the fluidized bed reactor 2. A particle separation unit 10 for separating the nanocarbon and the fluid catalyst or the fluid catalyst used in combination with the fluid medium included in the exhaust gas 9 from the exhaust gas 9 is connected to the exhaust gas path 8. The particle separation unit 10 is constituted by a cyclone or the like. A nanocarbon collection vessel 11 is connected to the nanocarbon separation side of the particle separation unit 10 through a nanocarbon collection path 10a. An exhaust gas path 10b for exhausting the exhaust gas 9 separated from the nanocarbon and the fluid catalyst or the fluid catalyst used in combination with the fluid medium is connected to the particle separation unit 10 at the side for exhausting the exhaust gas.

A supplying unit 2a for supplying the fluid catalyst or the fluid catalyst used in combination with the fluid medium 1 to the fluidized bed reactor 2 is connected to the wall of the fluidized bed reactor 2. Incidentally, the supplying unit 2a may be a single unit for supplying the fluid catalyst or the fluid catalyst used in combination with the fluid medium 1, or a supplying unit for supplying the fluid catalyst and a supplying unit for supplying the fluid medium may be provided independently and separately. In the drawing, the unit is shown by summarizing these cases. A nanocarbon exhaust path 19 for exhausting the nanocarbon produced in the fluidized bed reactor 2 is provided to the wall of the fluidized bed reactor 2. The nanocarbon collection vessel 11 is connected to the nanocarbon exhaust path 19.

Next, the process for producing nanocarbon using the device for producing nanocarbon shown in FIG. 1 is explained.

When the nanocarbon is produced, the fluid catalyst or the fluid catalyst used in combination with the fluid medium 1 is contained in the fluidized bed reactor 2. As the fluid catalyst, a fluid catalyst in which 1 to 50% by mass of a nickel fine particle of 1 to 500 nm is supported on a silica carrier of 1 to 200 μm, or a fluid catalyst in which 1 to 50% by mass of an iron fine particle of 1 to 500 nm is supported on an alumina carrier of 1 to 200 μm is used. Further, a fluid medium is added to the fluid catalyst. As the fluid medium, sand particles, silica particles or alumina particles of 100 to 200 μm or a mixture thereof can be used.

Incidentally, the fluid catalyst or the fluid catalyst used in combination with the fluid medium 1 is supplied to the fluidized bed reactor 2 from the supplying unit 2a, depending on the loss of the fluid catalyst or the fluid catalyst used in combination with the fluid medium 1 in the fluidized bed reactor 2. The fluid catalyst or the fluid catalyst used in combination with the fluid medium 1 may be supplied from the supplying unit 2a continuously with a constant rate, or supplied regularly or irregularly.

Into the lower part of the fluidized bed reactor 2 containing the fluid catalyst or the fluid catalyst used in combination with the fluid medium 1, the low hydrocarbon 3 such as methane is supplied through the low hydrocarbon supplying path 5a, and the oxygen 4 is supplied to the lower part of the fluidized bed reactor 2 through the oxygen supplying path 5b. The low hydrocarbon 3 and the oxygen 4 supplied to the lower part of the fluidized bed reactor 2 are mixed to form a mixed gas, pass through the dispersing plate 6 upwards, are dispersed and supplied to the fluid catalyst or the fluid catalyst used in combination with the fluid medium 1. The concentration of the oxygen 4 included in the mixed gas is preferably 5 to 25% by volume when the low hydrocarbon is converted to methane. Further, the low hydrocarbon 3 is preferably supplied under a condition that the SV value is 40,000 to 80,000 NL/kg-catal./h in the methane conversion. In addition, it is preferable to preheat the mixed gas to 400 to 500° C. and supply it to the fluid catalyst or the fluid catalyst used in combination with the fluid medium 1.

The mixed gas flowing towards the dispersing plate 6 is ignited by the ignition device 7 under the dispersing plate 6. From this, a part of the mixed gas combusts, and the mixed gas, which has been heated to the temperature at which the decomposition reaction of the low hydrocarbon progresses, is supplied to the fluid catalyst or the fluid catalyst used in combination with the fluid medium 1. Incidentally, the ignition of the mixed gas by the ignition device 7 is not necessarily conducted continuously. When the temperature of the fluidized bed formed in the fluidized bed reactor 2 has reached the combustion temperature of the mixed gas, it is not necessary to ignite the mixed gas by the ignition device 7.

The fluidized bed is formed in the fluidized bed reactor 2 by supplying the mixed gas to the fluid catalyst or the fluid catalyst used in combination with the fluid medium 1. As such, the inside of the fluidized bed reactor 2 is composed of a fluidized bed part where the fluidized bed is formed, and a free board part which is a space above the fluidized bed part.

At the fluidized bed part, the fluid catalyst or the fluid catalyst used in combination with the fluid medium 1 and the mixed gas contact each other, and the decomposition reaction of the low hydrocarbon accompanied by the self-combustion of the low hydrocarbon and the oxygen progresses. In this regard, it is preferable to set the temperature of the decomposition reaction to 500 to 1000° C. and set the pressure to 10 atmospheres or less, by appropriately setting the reaction condition. Through the decomposition reaction of the low hydrocarbon, nanocarbon is produced, and an exhaust gas including hydrogen, carbon dioxide, carbon monoxide, water (water vapor) and the like is generated. The unreacted low hydrocarbon is also included in the exhaust gas. The nanocarbon produced has a diameter of 1 to 500 nm and a length of 100 μm or less. In addition, the concentration of carbon dioxide included in the exhaust gas is preferably 1 to 10% by volume, and the concentration of water included in the exhaust gas is preferably 1 to 20% by volume.

The nanocarbon produced in the fluidized bed reactor 2 moves to the upper bed of the fluidized bed and reaches to the free board part, due to the differences in the bulk gravity and the diameter from the fluid catalyst or the fluid catalyst used in combination with the fluid medium 1, or due to the volume expansion. The nanocarbon that has been reached to the free board part is exhausted through the nanocarbon exhaust path 19. Nanocarbon 20 exhausted is collected in the nanocarbon collection vessel 11. Incidentally, the nanocarbon 20 exhausted may be transferred to the next process.

In addition, the exhaust gas produced in the fluidized bed reactor 2 is exhausted through the exhaust gas path 8. The exhaust gas 9 exhausted through the exhaust gas path 8 is introduced to the particle separation unit 10 through the exhaust gas path 8. Dispersed nanocarbon and the fluid catalyst or the fluid catalyst used in combination with the fluid medium are included in the exhaust gas 9. In the particle separation unit 10, the nanocarbon and the fluid catalyst or the fluid catalyst used in combination with the fluid medium are separated from the exhaust gas 9. Nanocarbon 12 separated is collected in the nanocarbon collection vessel 11 through the nanocarbon collection path 10a. The exhaust gas 9 separated from the nanocarbon and the fluid catalyst or the fluid catalyst used in combination with the fluid medium is exhausted through the exhaust gas path 10b, and a treatment to separate hydrogen from the exhaust gas 9 and the like are conducted, if necessary.

Incidentally, a screw feeder moving reaction bed, which conducts the decomposition reaction of the low hydrocarbon while it transfers the fluid catalyst and has an external or internal heating mechanism, may be provided to the fluidized bed reactor 2. In this case, in the screw feeder moving reaction bed, a particle in which the nanocarbon and the catalyst metal fine particle are bound to each other is produced into a seed of the nanocarbon; the seed is sent to the fluidized bed reactor; and the seed can be developed close to the limit over a sufficient time in a large space in the fluidized bed reactor. One of the effects thereof is that the production amount of nanocarbon can be increased remarkably. Another effect is that a seed having a small bulk density can be produced and the seed can be developed into nanocarbon having a small bulk density in the fluidized bed reactor, by controlling the production condition of the particle, in which nanocarbon and the catalyst metal fine particle are bound to each other, in the screw feeder moving reaction bed. As a result, it is possible to obtain nanocarbon having a bulk density smaller than that of the nanocarbon produced directly in a fluidized bed reactor without providing a screw feeder moving reaction bed. The nanocarbon having a small bulk density always has a high dispersibility, and it becomes easy to remove the catalyst remaining in the nanocarbon; which leads to the characteristic to largely reduce the cost of the dispersion treatment and purification treatment, which are the causes of the high cost of nanocarbon.

Embodiment 2

Figure 2:
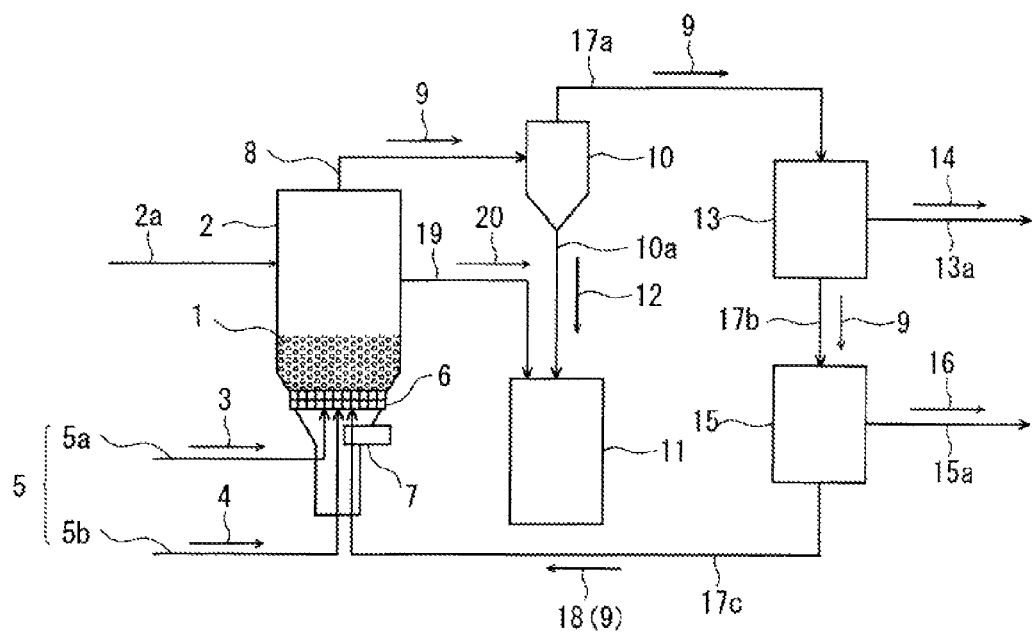
FIG. 2 is a schematic drawing showing a device for producing nanocarbon of another embodiment of this invention, which has a structure in which the exhaust gas separated from gasses other than the low hydrocarbon refluxes into the fluidized bed reactor.

Next, another embodiment is explained based on FIG. 2.

Unreacted low hydrocarbon is included in the exhaust gas 9 exhausted from the fluidized bed reactor 2. When the unreacted low hydrocarbon can be provided to the decomposition reaction again, the loss of the low hydrocarbon serving as the raw material can be reduced, and nanocarbon can be produced in a high yield. Thus, the device for producing nanocarbon shown in FIG. 1 may include a structure to separate the gasses other than the low hydrocarbon such as hydrogen, carbon dioxide and water from the exhaust gas 9 exhausted from the particle separation unit 10, and reflux the exhaust gas 9 separated from the gasses other than the low hydrocarbon to the fluidized bed reactor 2.

The device for producing nanocarbon of this embodiment has a structure to reflux the exhaust gas 9 separated from the gasses other than the low hydrocarbon to the fluidized bed reactor 2, in addition to the structure shown in FIG. 1.

FIG. 2 is a schematic drawing showing a device for producing nanocarbon of this embodiment. As shown in the drawing, instead of the exhaust gas path 10b, a hydrogen separation unit 13, a carbon dioxide/water separation unit 15 and gas refluxing paths 17a, 17b and 17c, which are described below, are provided to the side for exhausting the exhaust gas of the particle separation unit 10 in the device for producing nanocarbon shown in FIG. 1. Incidentally, the same symbols are used for the structures similar to those of the above-described embodiment, and the explanations for the symbols are omitted or simplified.

The hydrogen separation unit 13 for separating hydrogen from the exhaust gas 9 separated from the nanocarbon and the fluid catalyst or the fluid catalyst used in combination with the fluid medium is connected, through the gas refluxing path 17a, to the particle separation unit 10 at the side for exhausting the exhaust gas separated from the nanocarbon and the fluid catalyst or the fluid catalyst used in combination with the fluid medium. A hydrogen collection vessel (not described in the drawing) is connected to the hydrogen separation side of the hydrogen separation unit 13 through a hydrogen exhaust path 13a for exhausting hydrogen 14.

The carbon dioxide/water separation unit 15 for separating carbon dioxide and water (water vapor) from the exhaust gas 9 separated from hydrogen is connected through the gas refluxing path 17b to the hydrogen separation unit 13 at the side for exhausting the exhaust gas separated from hydrogen. A carbon dioxide/water exhaust path 15a for exhausting carbon dioxide and water 16 is connected to the carbon dioxide/water separation side of the carbon dioxide/water separation unit 15. The side for exhausting the exhaust gas separated from carbon dioxide and water of the carbon dioxide/water separation unit 15 is connected through the gas refluxing path 17c to the lower part of the fluidized bed reactor 2 at the position under the dispersion palate 6.

Next, the process for producing nanocarbon using the device for producing nanocarbon shown in FIG. 2 is explained.

First, as in the case shown in FIG. 1, into the lower part of the fluidized bed reactor 2 containing the fluid catalyst or the fluid catalyst used in combination with the fluid medium 1, the low hydrocarbon 3 such as methane is supplied through the low hydrocarbon supplying path 5a, and the oxygen 4 is supplied through the oxygen supplying path 5b.

As the fluid catalyst, a fluid catalyst in which 1 to 50% by mass of a nickel fine particle of 1 to 500 nm is supported on a silica carrier of 1 to 200 µm, or a fluid catalyst in which 1 to 50% by mass of an iron fine particle of 1 to 500 nm is supported on an alumina carrier of 1 to 200 µm is preferably used. Further, a fluid medium is added to the fluid catalyst. As the fluid medium, sand particles, silica particles or alumina particles of 100 to 200 µm or a mixture thereof can be used.

The low hydrocarbon 3 and the oxygen 4 supplied to the lower part of the fluidized bed reactor 2 are mixed to form a mixed gas, dispersed by the dispersing plate 6, and supplied to the fluid catalyst or the fluid catalyst used in combination with the fluid medium 1. The low hydrocarbon 3 is preferably supplied under a condition that the SV value is 40,000 to 80,000 NL/kg-catal./h in the methane conversion. In addition, it is preferable to preheat the mixed gas to 400 to 500° C. and supply it to the fluid catalyst or the fluid catalyst used in combination with the fluid medium 1. The concentration of the oxygen 4 included in the mixed gas is preferably 5 to 25% by volume when the low hydrocarbon is converted to methane.

Furthermore, the exhaust gas 9 separated from the gasses other than the low hydrocarbon and refluxed is mixed to the low hydrocarbon 3 and the oxygen 4 as described below. The mixed gas flowing towards the dispersing plate 6 is ignited by the ignition device 7 under the dispersing plate 6. From this, a part of the mixed gas combusts, and the mixed gas, which has been heated to the temperature at which the decomposition reaction of the low hydrocarbon progresses, is supplied to the fluid catalyst or the fluid catalyst used in combination with the fluid medium 1.

In this regard, it is preferable to set the temperature of the decomposition reaction to 500 to 1000° C. and set the pressure to 10 atmospheres or less, by appropriately setting the reaction condition.

Incidentally, as in the case shown in FIG. 1, the fluid catalyst or the fluid catalyst used in combination with the fluid medium 1 is supplied to the fluidized bed reactor 2 from the supplying unit 2a, depending on the loss of the fluid catalyst or the fluid catalyst used in combination with the fluid medium 1 in the fluidized bed reactor 2.

As in the case shown in FIG. 1, the fluidized bed is formed in the fluidized bed reactor 2 by supplying the mixed gas to the fluid catalyst or the fluid catalyst used in combination with the fluid medium 1, and the decomposition reaction of the low hydrocarbon accompanied by the self-combustion of the low hydrocarbon and oxygen progresses. Through the decomposition reaction of the low hydrocarbon, nanocarbon is produced, and an exhaust gas including hydrogen, carbon dioxide, carbon monoxide, water (water vapor) and the like is generated. Unreacted low hydrocarbon is also included in the exhaust gas.

Through the decomposition reaction of the low hydrocarbon, nanocarbon is produced, and an exhaust gas including hydrogen, carbon dioxide, carbon monoxide, water (water vapor) and the like is generated. Unreacted low hydrocarbon is also included in the exhaust gas. The nanocarbon produced has a diameter of 1 to 500 nm and a length of 100 µm or less. In addition, the concentration of carbon dioxide included in the exhaust gas is 1 to 10% by volume, and the concentration of water included in the exhaust gas is 1 to 20% by volume.

The nanocarbon produced in the fluidized bed reactor 2 is exhausted through the nanocarbon exhaust path 19, as in the case shown in FIG. 1. The nanocarbon 20 exhausted is collected in the nanocarbon collection vessel 11.

Further, the exhaust gas generated in the fluidized bed reactor 2 is exhausted through the exhaust gas path 8, as in the case shown in FIG. 1. The exhaust gas 9 exhausted is introduced to the particle separation unit 10 through the exhaust gas path 8. The nanocarbon and the fluid catalyst or the fluid catalyst used in combination with the fluid medium are separated from the exhaust gas 9 in the particle separation unit 10. The nanocarbon 12 separated is collected in the nanocarbon collection vessel 11.

Furthermore, the exhaust gas 9 separated from the nanocarbon and the fluid catalyst or the fluid catalyst used in combination with the fluid medium by the particle separation unit 10 is introduced to the hydrogen separation unit 13 through the gas refluxing path 17a. The hydrogen 14 is separated from the exhaust gas 9 separated from the nanocarbon and the fluid catalyst or the fluid catalyst used in combination with the fluid medium in the hydrogen separation unit 13. The hydrogen 14 separated is collected in the hydrogen collection vessel (not described in the drawing) through the hydrogen exhaust path 13a. Incidentally, the hydrogen 14 separated may be transferred to the next process.

The exhaust gas 9 separated from the hydrogen 14 by the hydrogen separation unit 13 is introduced to the carbon dioxide/water separation unit 15 through the gas refluxing path 17b. The carbon dioxide and water 16 are separated from the exhaust gas 9 separated from the hydrogen 14 in the carbon dioxide/water separation unit 15. The carbon dioxide and water 16 separated are exhausted through the carbon dioxide/water exhaust path 15a.

The exhaust gas 9 separated from the carbon dioxide and water 16 by the carbon dioxide/water separation unit 15 is introduced to the lower part of the fluidized bed reactor 2 as a reflux gas 18 through the gas refluxing path 17c. The reflux gas 18 introduced to the lower part of the fluidized bed reactor 2 is mixed with the low hydrocarbon 3 supplied through the low hydrocarbon supplying path 5a and the oxygen 4 supplied through the oxygen supplying path 5b, and supplied to the fluid catalyst or the fluid catalyst used in combination with the fluid medium 1 through the dispersing plate 6.

As such, the exhaust gas 9 exhausted from the fluidized bed reactor 2 undergoes the separation processes by the particle separation unit 10, the hydrogen separation unit 13 and the carbon dioxide/water separation unit 15 sequentially through the exhaust gas path 8 and the gas refluxing paths 17a, 17b and 17c, and then refluxed to the fluidized bed reactor 2. By refluxing the exhaust gas 9, the unreacted low hydrocarbon included in the exhaust gas 9 is provided to the decomposition reaction again.

The reflux gas 18 cooled through the above-described separation processes of hydrogen and the like may be heated by the heat exchange with the exhaust gas 9 before the separation processes. For example, by the heat exchange with the exhaust gas 9 at 500 to 800° C., the reflux gas 18 can be heated to 400 to 500° C. The heat exchange can be conducted through a heat exchanger (not described in the drawing).

Incidentally, in the above-described embodiment, the carbon dioxide/water separation unit 15 is provided as a single separation unit. However, a carbon dioxide separation unit for separating carbon dioxide from the exhaust gas 9 and a water separation unit for separating water (water vapor) from the exhaust gas 9 may be provided separately and independently. In this case, for example, the carbon dioxide separation unit is provided to the hydrogen separation unit 13 at the side for exhausting the exhaust gas separated from hydrogen, and the water separation unit is provided to the carbon dioxide separation unit at the side for exhausting the exhaust gas separated from carbon dioxide.

Embodiment 3

Figure 3:
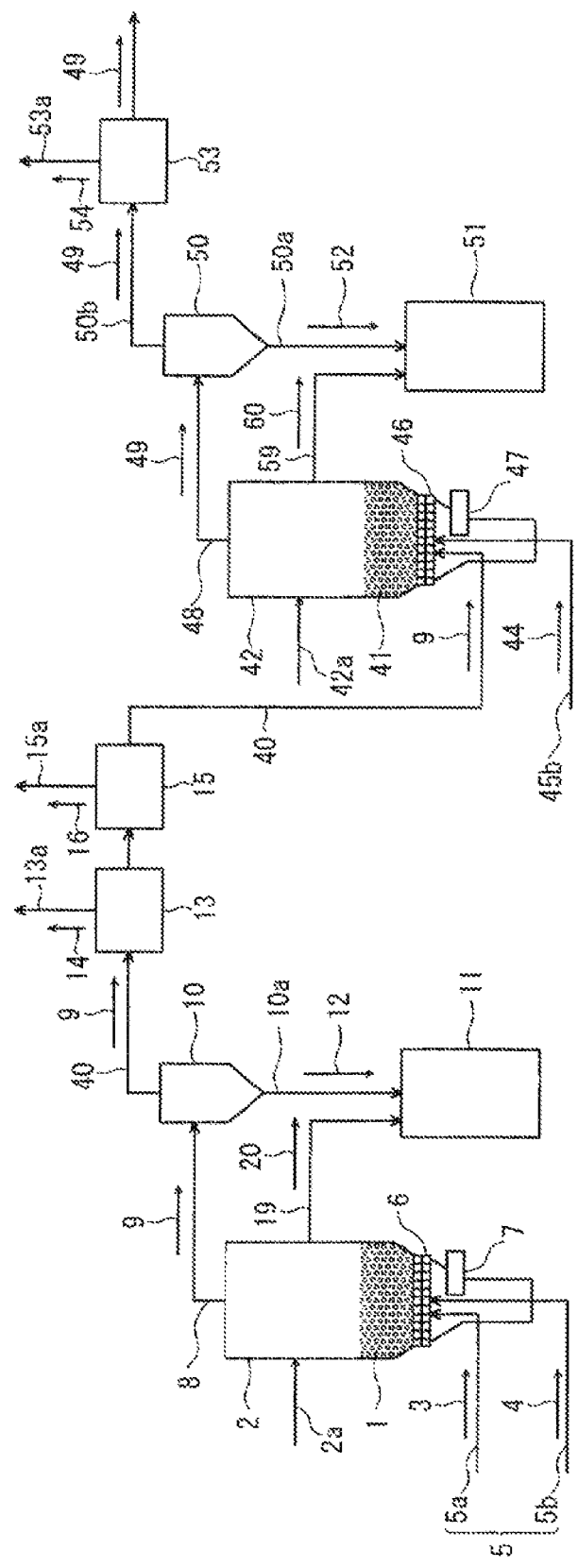
FIG. 3 is a schematic drawing showing a device for producing nanocarbon of still another embodiment of this invention, which has a two-stage fluidized bed reactor.

Next, another embodiment is explained based on FIG. 3.

The decomposition reaction of the low hydrocarbon may be constituted by several stages, or may be constituted by providing several-stages fluidized bed reactors and sequentially introducing the exhaust gas exhausted from an upstream fluidized bed reactor to a downstream fluidized bed reactor. From this, the decomposition reaction of the low hydrocarbon included in the exhaust gas is possible in each fluidized bed reactor, the loss of the low hydrocarbon serving as the raw material can be reduced and nanocarbon can be produced in a high yield. In this embodiment, a case in which two stages of fluidized bed reactors (a first stage and a second stage) are provided is explained.

FIG. 3 is a schematic drawing showing the device for producing nanocarbon of this embodiment. As shown in the drawing, a structure having the fluidized bed reactor 2, the supplying unit 2a, the low hydrocarbon supplying path 5a, the oxygen supplying path 5b, the dispersing plate 6, the ignition device 7, the exhaust gas path 8, the particle separation unit 10, the nanocarbon collection path 10a, the nanocarbon collection vessel 11 and the nanocarbon exhaust path 19, which are similar to those in the structure shown in FIG. 1, is provided in the first stage. Incidentally, the same symbols are used for the structures similar to those of the above-described embodiment, and the explanations for the symbols are omitted or simplified.

The structure of the second stage is connected to the first stage particle separation unit 10 at the side for exhausting the exhaust gas, through an exhaust gas supplying path 40, to which the hydrogen separation unit 13 and the carbon dioxide/water separation unit 15 are provided in this order. The structure of the second stage is basically same as the structure of the first stage, and includes a fluidized bed reactor 42, a supplying unit 42a, an oxygen supplying path 45b, a dispersing plate 46, an ignition device 47, an exhaust gas path 48, a particle separation unit 50, a nanocarbon collection path 50a, a nanocarbon collection vessel 51 and a nanocarbon exhaust path 59, as in the structure of the first stage.

The exhaust gas supplying path 40 is connected to the lower part of the second stage fluidized bed reactor 42 at the position under the dispersing plate 46, and the unreacted low hydrocarbon produced in the first stage fluidized bed reactor 2 is supplied through the exhaust gas supplying path 40. That is, the exhaust gas 9, which is separated from the hydrogen 14 by the hydrogen separation unit 13 and separated from the carbon dioxide and water 16 by the carbon dioxide/water separation unit 15, and which includes the unreacted low hydrocarbon as the main component, is supplied to the lower part of the fluidized bed reactor 42.

Further, oxygen 44 is supplied through the oxygen supplying path 45b to the lower part of the second stage fluidized bed reactor 42. The exhaust gas 9 and the oxygen 44 supplied to the lower part of the fluidized bed reactor 42 are mixed to form a mixed gas, dispersed by the dispersing plate 46, and supplied to a fluid catalyst or a fluid catalyst used in combination with a fluid medium 41. The mixed gas flowing towards the dispersing plate 46 is ignited by the ignition device 47 under the dispersing plate 46. From this, a part of the mixed gas combusts, and the mixed gas, which has been heated to the temperature at which the decomposition reaction of the low hydrocarbon progresses, is supplied to the fluid catalyst or the fluid catalyst used in combination with the fluid medium 41. Incidentally, the ratio of the oxygen 44 to be supplied to the fluid catalyst or the fluid catalyst used in combination with the fluid medium 41 is set to be lower than that of the oxygen 4 to be supplied to the fluid catalyst or the fluid catalyst used in combination with the fluid medium 1 in the first stage. Here, the fluid catalyst or the fluid catalyst used in combination with the fluid medium 41 is supplied to the fluidized bed reactor 42 from the supplying unit 42a, depending on the loss of the fluid catalyst or the fluid catalyst used in combination with the fluid medium 41 in the fluidized bed reactor 42, as in the structure of the first stage.

As in the first stage fluidized bed reactor 2, in the second stage fluidized bed reactor 42, the fluidized bed is formed by supplying the mixed gas to the fluid catalyst or the fluid catalyst used in combination with the fluid medium 41, and the decomposition reaction of the low hydrocarbon accompanied by the self-combustion of the low hydrocarbon and oxygen progresses. Accordingly, the unreacted low hydrocarbon included in the exhaust gas 9 exhausted from the first stage fluidized bed reactor 2 is decomposed in the second stage fluidized bed reactor 42, nanocarbon is produced and an exhaust gas including hydrogen, carbon dioxide, carbon monoxide, water (water vapor) and the like is generated.

The nanocarbon produced in the second stage fluidized bed reactor 42 is exhausted through the nanocarbon exhaust path 59, as in the structure of the first stage. Nanocarbon 60 exhausted is collected in the nanocarbon collection vessel 51.

Further, the exhausted gas produced in the fluidized bed reactor 42 is exhausted through the exhaust gas path 48, as in the structure of the first stage. An exhaust gas 49 exhausted is introduced to the particle separation unit 50 through the exhaust gas path 48. The nanocarbon and the fluid catalyst or the fluid catalyst used in combination with the fluid medium are separated from the exhaust gas 49 in the particle separation unit 50. Nanocarbon 52 separated is collected in the nanocarbon collection vessel 51. The exhaust gas 49 separated from the nanocarbon and the fluid catalyst or the fluid catalyst used in combination with the fluid medium is introduced to a hydrogen separation unit 53 through an exhaust gas exhaust path 50b. In the hydrogen separation unit 53, hydrogen 54 is separated from the exhaust gas 49 separated from the nanocarbon and the fluid catalyst or the fluid catalyst used in combination with the fluid medium. The hydrogen 54 separated is collected in a hydrogen collection vessel (not described in the drawing) through a hydrogen exhaust path 53a. Incidentally, the hydrogen 54 separated may be transferred to the next process. The exhaust gas 49 separated from hydrogen in the hydrogen separation unit 53 is treated with an operation for separating carbon dioxide and water if necessary, and collected.

Incidentally, the above-described embodiment has described a case where two stages of the fluidized bed reactors 2 and 42 are provided. However, it is possible to similarly constitute a structure having three or more stages of fluidized bed reactors.

Embodiment 4

Figure 4:
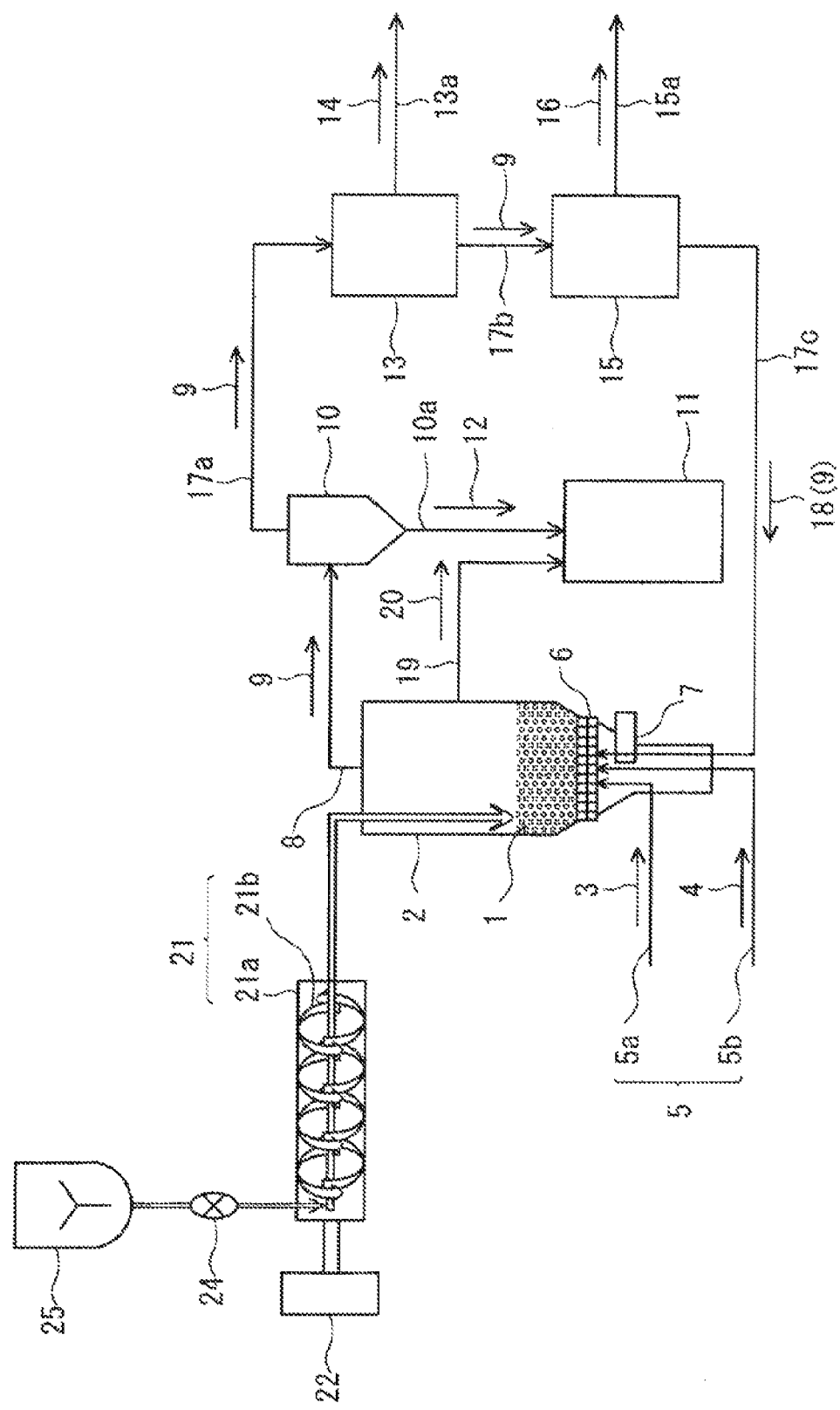
FIG. 4 is a schematic drawing showing a device for producing nanocarbon of still another embodiment of this invention, which has a screw feeder for supplying a fluid catalyst or a fluid catalyst used in combination with a fluid medium to the fluidized bed reactor.

Next, another embodiment is explained based on FIG. 4.

As explained above, during the decomposition reaction of the low hydrocarbon in the fluidized bed reactor 2 or 42, the fluid catalyst or the fluid catalyst used in combination with the fluid medium 1 or 41 forming the fluidized bed is dispersed and gradually exhausted from the fluidized bed reactor 2 or 42 with the exhaust gas 9 or 49. Thus, to the device for producing nanocarbon, it is possible to provide a screw feeder for supplying the fluid catalyst or the fluid catalyst used in combination with the fluid medium 1 or 41 to the fluidized bed reactor 2 or 42.

The device for producing nanocarbon of this embodiment includes a screw feeder for supplying the fluid catalyst or the fluid catalyst used in combination with the fluid medium to the fluidized bed reactor 2, in addition to the structure shown in FIG. 2.

FIG. 4 is a schematic drawing showing the device for producing nanocarbon of this embodiment. As shown in the drawing, a screw feeder 21 for supplying the fluid catalyst or the fluid catalyst used in combination with the fluid medium to the fluidized bed reactor 2 from the upper part of the fluidized bed reactor 2 is provided to the device for producing nanocarbon shown in FIG. 2. That is, the screw feeder 21 corresponds to the supplying unit of this invention. Incidentally, the same symbols are used for the structures similar to those of the above-described embodiments, and the explanations for the symbols are omitted or simplified.

The screw feeder 21 has a screw feeder main body 21a, and a screw 21b build in the screw feeder main body 21a. The screw 21b is rotary-driven by an external motor 22.

Further, a rotary feeder 24 is connected to the upstream of the screw feeder main body 21a. A hopper 25, in which the fluid catalyst or the fluid catalyst used in combination with the fluid medium 1 is contained, is connected to the rotary feeder 24. Those explained in the above-described embodiments can be used as the fluid catalyst or the fluid catalyst used in combination with the fluid medium 1.

Next, the operation of the device for producing nanocarbon shown in FIG. 4 is explained.

In this embodiment, as described above using FIG. 2, while the nanocarbon is produced, the fluid catalyst or the fluid catalyst used in combination with the fluid medium 1 is supplied to the fluidized bed reactor 2 by the screw feeder 21, depending on the loss of the fluid catalyst or the fluid catalyst used in combination with the fluid medium 1 in the fluidized bed reactor 2. Incidentally, the fluid catalyst supplied by the screw feeder 21 may be any of the unreacted fluid catalyst, the fluid catalyst provided to the decomposition reaction and including the nanocarbon, or the fluid catalyst obtained by pretreating the fluid catalyst provided to the decomposition reaction and including the nanocarbon, or a mixture thereof.

The fluid catalyst or the fluid catalyst used in combination with the fluid medium 1 is supplied to the upstream of the screw feeder main body 21a, from the hopper 25 containing the fluid catalyst or the fluid catalyst used in combination with the fluid medium 1, through the rotary feeder 24. By the rotary feeder 24, the fluid catalyst or the fluid catalyst used in combination with the fluid medium 1 can be supplied stably and quantitatively to the upstream of the screw feeder main body 21a. The fluid catalyst or the fluid catalyst used in combination with the fluid medium 1 supplied to the upstream is transferred to the downstream of the screw feeder main body 21a by the rotation of the screw 21b. The fluid catalyst or the fluid catalyst used in combination with the fluid medium 1 transferred to the downstream is supplied to the fluidized bed reactor 2 from the downstream edge. The fluid catalyst or the fluid catalyst used in combination with the fluid medium 1 may be supplied continuously with a constant rate, or supplied regularly or irregularly, to the fluidized bed reactor 2 by the screw feeder 21, depending on the loss of the fluid catalyst or the fluid catalyst used in combination with the fluid medium 1 in the fluidized bed reactor 2.

Incidentally, instead of the hopper 25 for containing the fluid catalyst or the fluid catalyst used in combination with the fluid medium 1, it is possible to adopt a structure in which a hopper for containing the fluid catalyst (not described in the drawing) and a hopper for containing the fluid medium (not described in the drawing) are connected separately to the upstream of the screw feeder main body 21a through rotary feeders (not described in the drawing). In this structure, the fluid catalyst and the fluid medium are supplied separately to the upstream of the screw feeder main body 21a. The fluid catalyst and the fluid medium supplied to the upstream are transferred to the downstream of the screw feeder main body 21*a* while they are mixed by the rotation of the screw 21*b*, and they are supplied to the fluidized bed reactor 2 from the downstream edge.

Incidentally, although the case in which the screw feeder 21 is provided to the device for producing nanocarbon shown in FIG. 2 is explained above, it is also possible to similarly provide the screw feeder 21 to the device for producing nanocarbon shown in FIG. 1 and supply the fluid catalyst or the fluid catalyst used in combination with the fluid medium 1.

Although the device in which the screw feeder is used as the supplying unit for supplying the fluid catalyst or the fluid catalyst used in combination with the fluid medium is explained in the above-described embodiment, it is also possible to use the screw feeder 21 as the moving reaction bed for feeding the fluid catalyst while conducting the decomposition reaction. Such an embodiment has an external or internal heating mechanism in the screw feeder 21. Further, a gas supplying unit for supplying the low hydrocarbon in the screw feeder is connected to the screw feeder.

Figure 5:
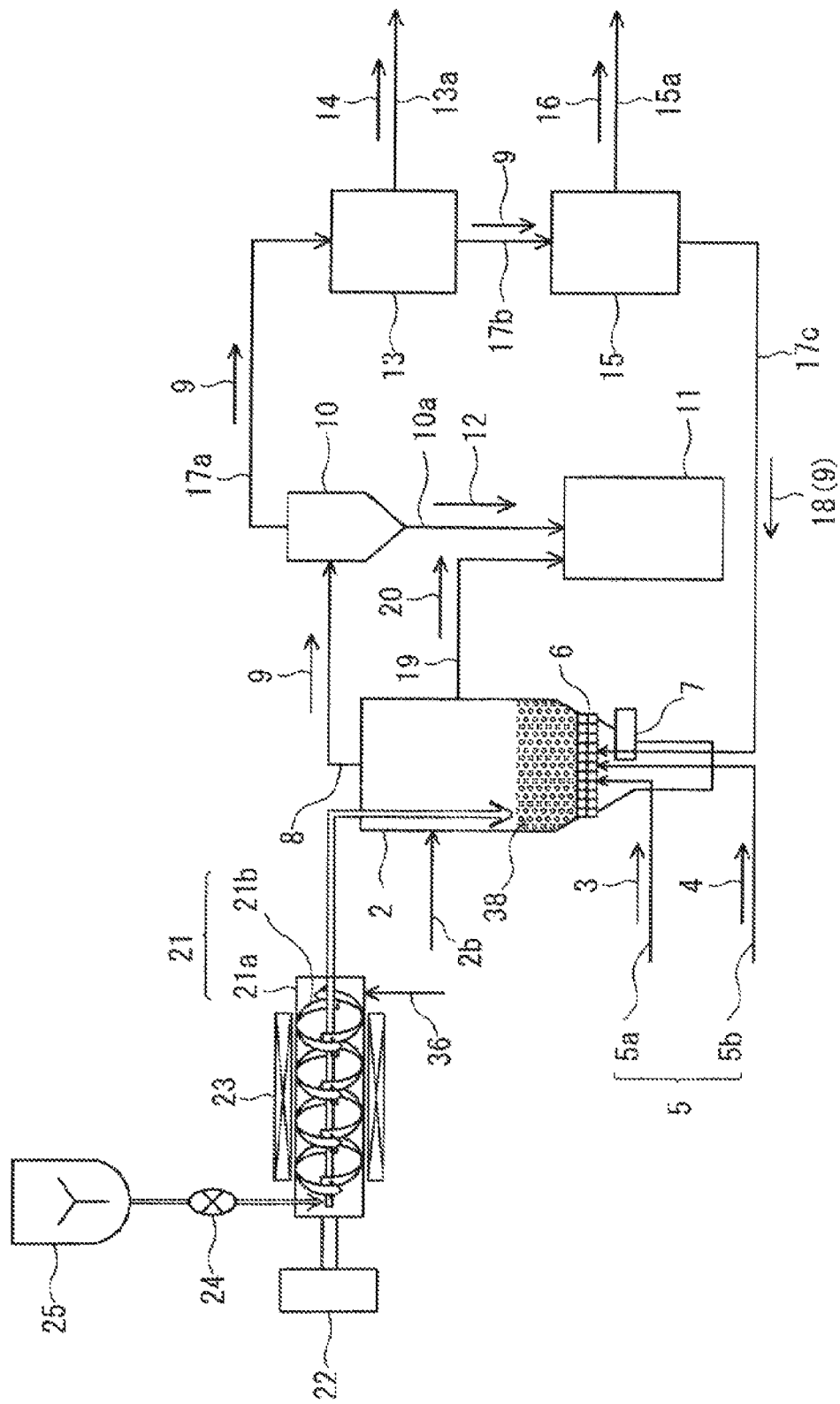
FIG. 5 is a schematic drawing showing a device for producing nanocarbon of still another embodiment of this invention, which uses a screw feeder as a moving reaction bed.

The embodiment using the screw feeder as the moving reaction bed is explained below based on FIG. 5.

A heater 23 is placed on the outer surface of the screw feeder main body 21*a* of the screw feeder 21, so that the heater surrounds the outer surface of the screw feeder main body 21*a*.

To the downstream of the screw feeder main body 21*a*, a gas supplying unit 36 for supplying the low hydrocarbon to the feeder main body 21*a* is connected.

Further, the rotary feeder 24 is connected to the upstream of the screw feeder main body 21*a*. The hopper 25 for containing the fluid catalyst is connected to the rotary feeder 24. In this embodiment, a catalyst metal fine particle is used as it is as the fluid catalyst. For example, a nickel fine particle of 1 to 500 nm and an iron fine particle of 1 to 500 nm are used.

To the fluidized bed reactor 2, the supplying unit 2*b* for supplying the fluid medium to the fluidized bed reactor 2 is connected. As the fluid medium, for example, sand particles, silica particles or alumina particles of 100 to 200 μm, or a mixture thereof may be used. Incidentally, the fluid medium may be transferred with the fluid catalyst by the screw feeder 21.

The fluid catalyst is supplied to the upstream of the screw feeder may body 21*a* from the hopper 25 through the rotary feeder 24. The fluid catalyst is transferred to the downstream of the screw feeder main body 21*a* by the rotation of the screw 21*b*. To the screw feeder main body 21*a*, the low hydrocarbon is supplied from the gas supplying unit 36, while the fluid catalyst is transferred. During this, inside of the screw feeder main body 21*a* is heated to a certain temperature by the heater 23.

The decomposition reaction of the low hydrocarbon progresses in the screw feeder main body 21*a*, nanocarbon is produced and bound with the fluid catalyst, and a seed is produced.

In the screw feeder 21, by adjusting the transfer speed by the screw, the heating temperature by the heater 23, the introduction amount of the low hydrocarbon to the screw feeder main body 21*a* and the like, the production of the seed can be controlled.

The fluid medium (not described in the drawing) is supplied to the fluidized bed reactor 2 from the supplying unit 2*b*, while the seed 38 is also supplied from the screw feeder 21. The decomposition reaction of the low hydrocarbon progresses in the fluidized bed reactor 2 to which the seed 38 and the fluid medium have been supplied. With the progress of the decomposition reaction of the low hydrocarbon, nanocarbon develops at the seed 38 in the fluidized bed reactor 2. In the fluidized bed reactor 2, the seed can be developed close to the limit over a sufficient time in the large space.

As described above, by combining the screw feeder 21 as the moving reaction bed with the fluidized bed reactor 2, the production amount of the nanocarbon can be remarkably increased. Further, with the screw feeder 21 as the moving reaction bed, by controlling the production condition of the particle, in which the nanocarbon and the catalyst metal fine particle are bound to each other, seed 38 having a small bulk density can be produced. The seed 38 having a small bulk density can be developed to nanocarbon having a small bulk density in the fluidized bed reactor 2. As a result, it is possible to obtain nanocarbon having a bulk density smaller than that of the nanocarbon produced directly in the fluidized bed reactor 2 without using the screw feeder 21 as the moving reaction bed. The nanocarbon having a small bulk density always has a high dispersibility, and it is easy to remove the catalyst metal particle remaining in the nanocarbon. Therefore, it is possible to largely reduce the cost of the dispersion treatment and purification treatment, which are the causes of the high cost of nanocarbon.

Figure 6:
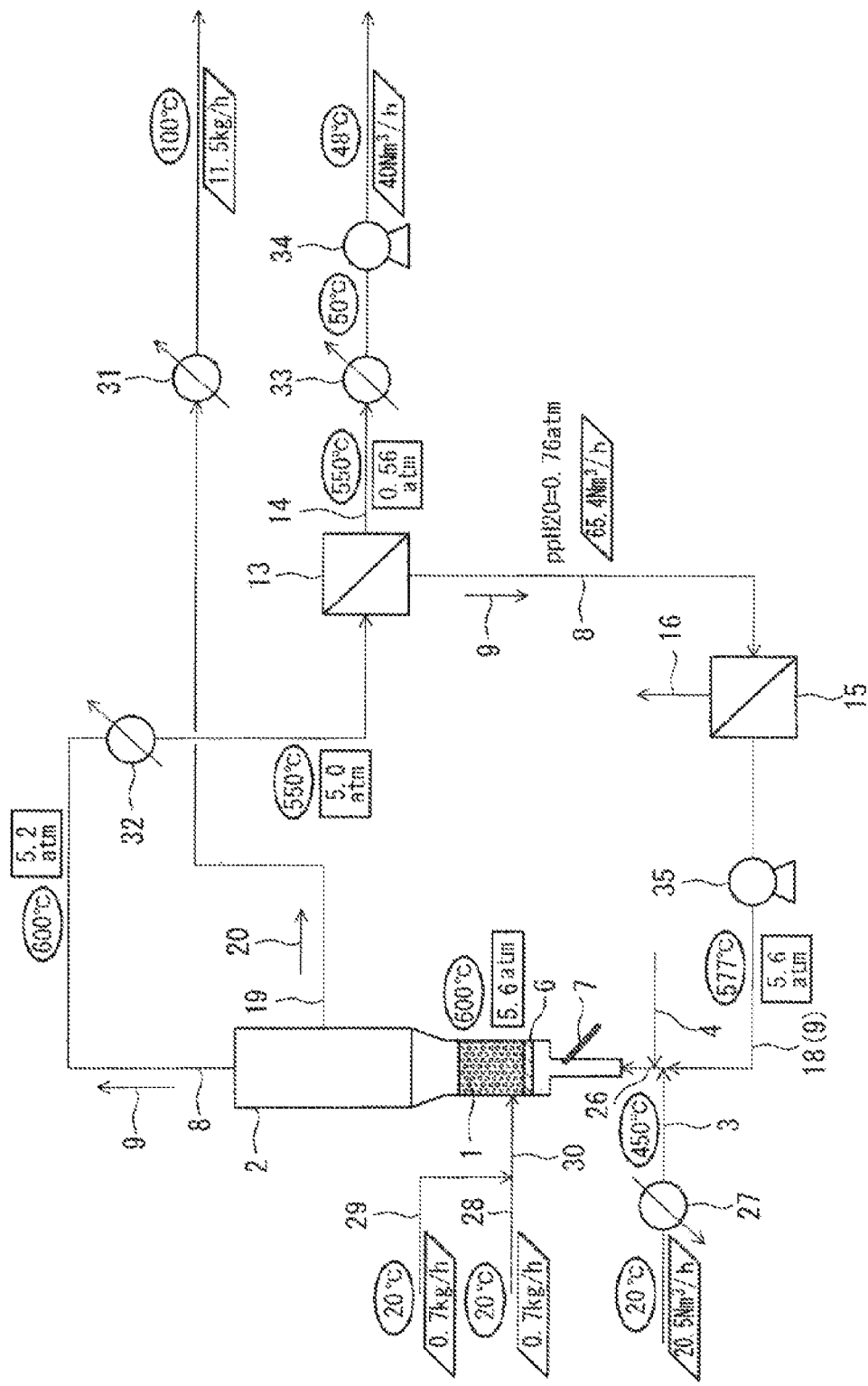
FIG. 6 is a drawing showing an example of a simulated material balance in a device for producing nanocarbon.
Figure 7:
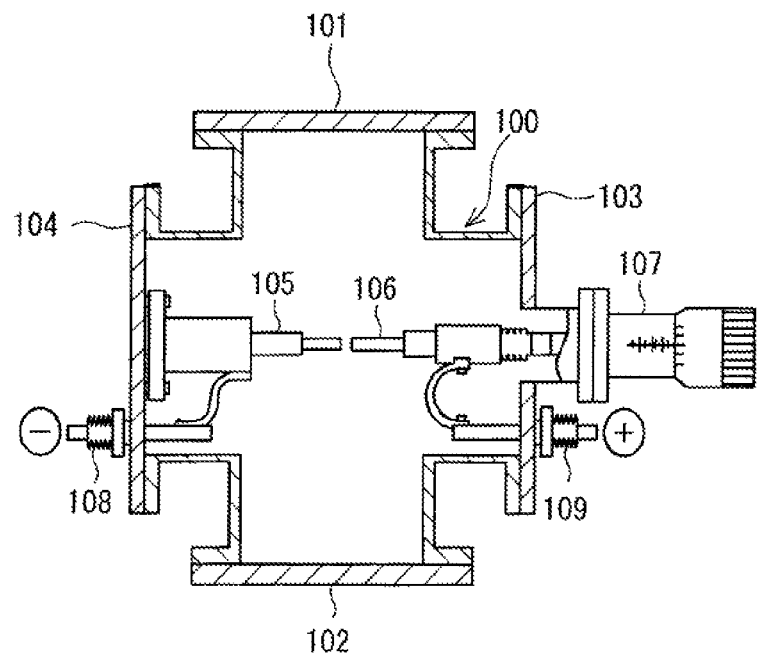
FIG. 7 is a schematic drawing showing a related-art device for producing carbon nanotube by arc discharging method.
Figure 8:
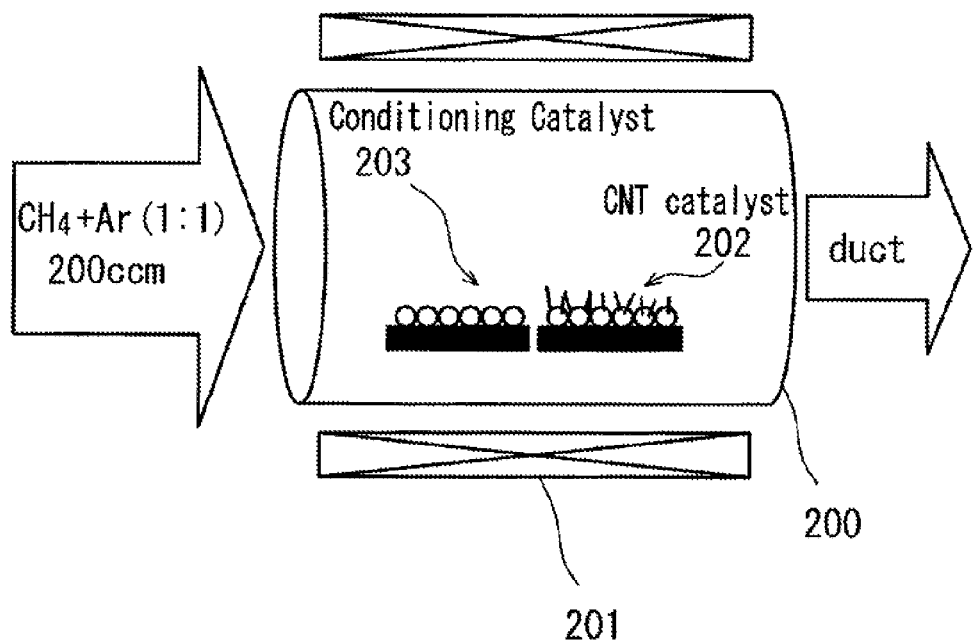
FIG. 8 is a schematic drawing showing the related-art device for synthesizing carbon nanotube by CVD method (a horizontal electric furnace)
Figure 9:
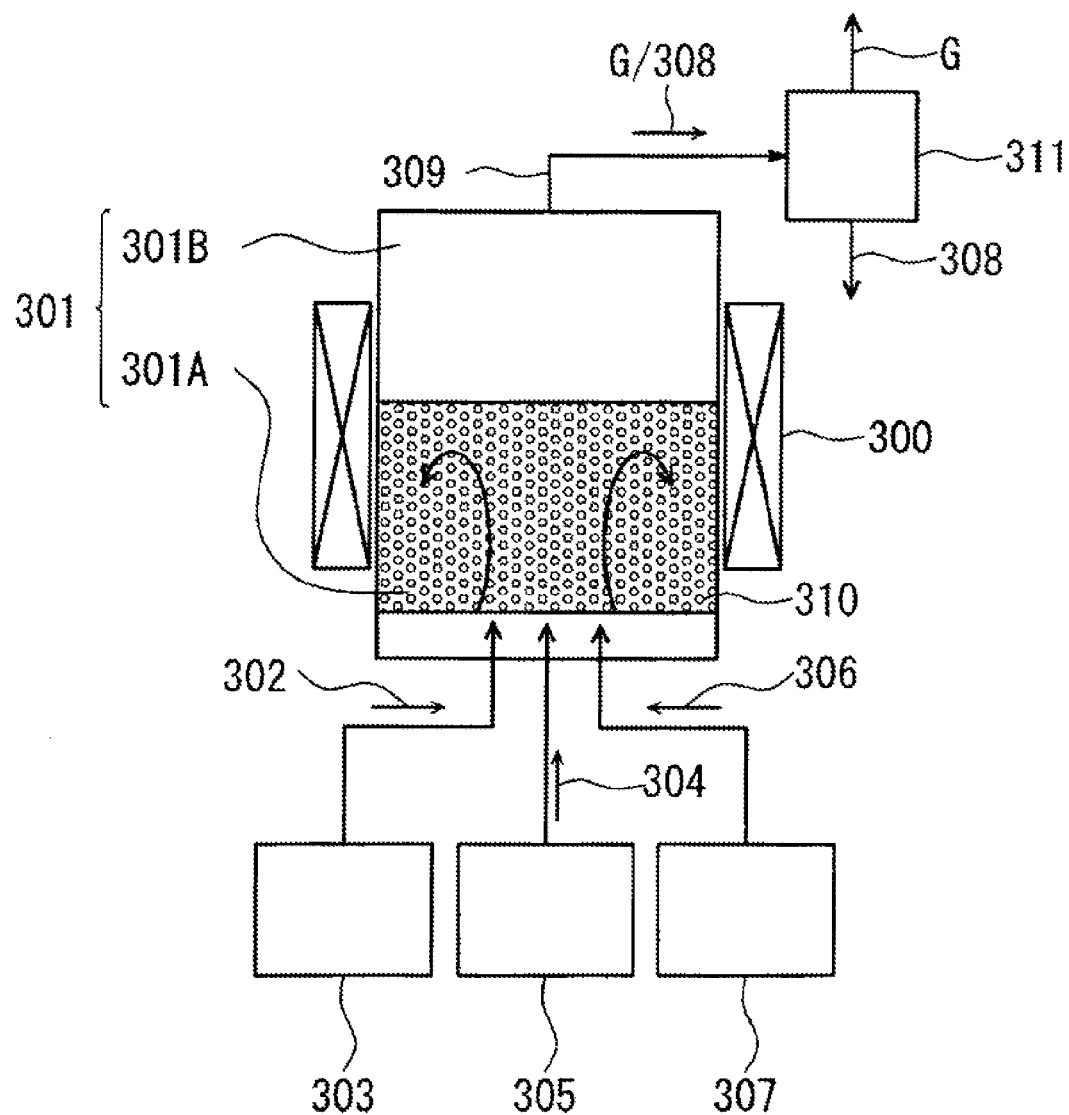
FIG. 9 is a schematic drawing showing the related-art device for producing fiber nanocarbon using a fluidized bed reactor.

Next, the material balance during the nanocarbon production in the device for producing nanocarbon shown in FIG. 4 is explained based on FIG. 6.

FIG. 6 is a schematic drawing showing an example of the simulated material balance before and after passing each unit in the device for producing nanocarbon. Incidentally, a number in an ellipse indicates the temperature (° C.) of the substance at the position marked with the ellipse, a number in a rectangle indicates the pressure (atm) of the substance at the position marked with the rectangle, and a number in a parallelogram indicates the flow rate (Nm$^3$/h or kg/h) of the substance at the position marked with the parallelogram.

The mixed gas 26 of the low hydrocarbon 3 such as methane at a flow rate of 20.5 Nm$^3$/h and the oxygen 4 at a flow rate of 4.45 Nm$^3$/h is supplied to the lower part of the fluidized bed reactor 2. Incidentally, the low hydrocarbon 3 has been heated to 20° C. to 450° C. by a heater 27 before it is mixed with the oxygen 4. Further, as described below, the exhaust gas 9 separated from hydrogen, carbon dioxide and the like is mixed to the low hydrocarbon 3 and the oxygen 4 as the reflux gas 18. The reflux gas 18 is a gas in which carbon dioxide and the like are separated from the exhaust gas at a flow rate of 65.4 Nm$^3$/h after separating hydrogen.

At the lower part of the fluidized bed reactor 2, the mixed gas 26 is ignited by the ignition device 7 under the dispersing plate 6, and a part of the mixed gas 26 combusts. From this, the temperature of the mixed gas 26 reaches the reaction temperature of 600° C. or higher. The mixed gas 26 heated to the reaction temperature of 600° C. or higher is dispersed by the dispersing plate 6 and supplied to the fluid catalyst or the fluid catalyst used in combination with the fluid medium 1. By supplying the mixed gas 26 to the fluid catalyst or the fluid catalyst used in combination with the fluid medium 1, the fluidized bed is formed in the fluidized bed part of the fluidized bed reactor 2.

A mixture 30 of a fluid catalyst 28 supplied at a flow rate of 0.7 kg/h and a fluid medium 29 supplied at a flow rate of 0.7 kg/h is continuously introduced to the fluidized bed reactor 2 where the fluidized bed is formed.

The decomposition reaction of the low hydrocarbon accompanied by the self-combustion of the low hydrocarbon and oxygen progresses in the fluidized bed part formed in the fluidized bed reactor 2. From this, nanocarbon and an exhaust gas including hydrogen, unreacted low hydrocarbon, carbon dioxide, carbon monoxide, water (water vapor), nitrogen and the like are produced. The temperature of the fluidized bed part, where the decomposition reaction progresses, is 600° C. and the pressure thereof is 5.6 atm.

The nanocarbon produced in the fluidized bed reactor 2 reaches the free board part in the fluidized bed reactor 2 and is exhausted through the nanocarbon exhaust path 19. The nanocarbon 20 exhausted through the nanocarbon exhaust path 19 is cooled to 100° C. by a condenser 31 and collected at a flow rate of about 11.5 kg/h.

Further, the exhaust gas generated in the fluidized bed reactor 2 is exhausted through the exhaust gas path 8. The temperature of the exhaust gas 9 exhausted is 600° C., and the pressure thereof is 5.2 atm. The exhaust gas 9 exhausted is cooled to 550° C. by a condenser 32 and then supplied to the hydrogen separation unit 13. The pressure of the exhaust gas 9 is 5.0 atm after it is cooled by the condenser 32 and before it is supplied to the hydrogen separation unit 13.

In the hydrogen separation unit 13, the hydrogen 14 is separated from the exhaust gas 9 by a hydrogen permeable membrane. A vacuum pump 34 for reducing the pressure at the hydrogen permeating side to accelerate the hydrogen permeation is connected to the hydrogen separation membrane at the hydrogen permeating side through a condenser 33. The temperature of the hydrogen 14 that has permeated through the hydrogen permeable membrane and has been separated from the exhaust gas 9 is 550° C. and the pressure thereof is 0.56 atm.

The hydrogen 14 separated is cooled to 50° C. by the condenser 33 and then exhausted from the exhaust side of the vacuum pump 34. The temperature of the hydrogen 14 exhausted is 48° C. and the flow rate thereof is about 40 Nm³/h.

In addition, the exhaust gas 9 exhausted from the side for exhausting the exhaust gas of the hydrogen separation unit 13 is supplied to the carbon dioxide/water separation unit 15 at a flow rate of 65.4 Nm³/h. In the carbon dioxide/water separation unit 15, the carbon dioxide and water (water vapor) 16 are separated from the exhaust gas 9 by a low hydrocarbon separation membrane (methane separation membrane). Incidentally, by the low hydrocarbon separation membrane, gasses other than the low hydrocarbon such as carbon monoxide, nitrogen and the like are separated from the exhaust gas 9 in addition to the carbon dioxide and water (water vapor) 16.

Regarding the exhaust gas 9 exhausted from the side for exhausting the exhaust gas of the carbon dioxide/water separation unit 15, the pressure is raised to 5.6 atm and the temperature is raised to 577° C. by a compressor 35. As described above, the exhausted gas 9 after temperature rising and pressure rising is mixed as the reflux gas 18 to the low hydrocarbon 3 and the oxygen 4 to be supplied to the lower part of the fluidized bed reactor 2.

Thus, during the nanocarbon is produced, the mixed gas 26 of the low hydrocarbon 3, the oxygen 4 and the reflux gas 18 is supplied to the fluidized bed in the fluidized bed reactor 2. The temperature of the fluidized bed is already reached to the combustion temperature of the mixed gas 26, and thus, the mixed gas 26 self-combusts without the ignition by the ignition device 7. From this, nanocarbon is produced by the decomposition reaction of the low hydrocarbon without supplying energy from outside.

This invention has been explained based on the above-described embodiments. However, this invention is not limited by the contents of the above explanation, and an appropriate change is possible as long as it does not depart from the scope of this invention.

Although this invention has been explained in detail and with reference to specific embodiments, it is obvious to one skilled in the art that various changes and modifications can be added without departing from the spirit and scope of this invention. This application is based on the Japanese patent application filed on May 10, 2011 (JP2011-105267), and the content thereof is incorporated herewith as a reference.

DESCRIPTION OF REFERENCE NUMERALS AND SIGNS

1: Fluid catalyst or fluid catalyst used in combination with fluid
2: medium
2: Fluidized bed reactor
2a: Supplying unit
2b: Supplying unit
3: Low hydrocarbon
4: Oxygen
5: Gas supplying path
5a: Low hydrocarbon supplying path
5b: Oxygen supplying path
6: Dispersing plate
7: Ignition device
8: Exhaust gas path
9: Exhaust gas
10: Particle separation unit
11: Nanocarbon collection vessel
12: Nanocarbon
13: Hydrogen separation unit
14: Hydrogen
15: Carbon dioxide/water separation unit
16: Carbon dioxide and water
17a: Gas refluxing path
17b: Gas refluxing path
17c: Gas refluxing path
18: Reflux gas
19: Nanocarbon exhaust path
20: Nanocarbon
21: Screw feeder
36: Gas supplying unit
38: Seed
41: Fluid catalyst
42: Fluidized bed reactor
42a: Supplying unit
44: Oxygen
45b: Oxygen supplying path
46: Dispersing plate
48: Exhaust gas path
49: Exhaust gas
52: Nanocarbon
60: Nanocarbon

The invention claimed is:
1. A device for producing nanocarbon, comprising;
a fluidized bed reactor configured to contain therein a fluid catalyst or a fluid catalyst used in combination with a fluid medium and to cause therein a self-combustion of a low hydrocarbon and oxygen while being supplied with the low hydrocarbon and the oxygen;
a gas supplying unit connected to a lower part of the fluidized bed reactor and configured to supply the low hydrocarbon and the oxygen to the fluidized bed reactor, wherein the low hydrocarbon and the oxygen are mixed into a mixed gas;

an exhaust gas path connected to the fluidized bed reactor and configured to exhaust an exhaust gas in the fluidized bed reactor to outside;

a supplying unit connected to the fluidized bed reactor and configured to supply the fluid catalyst or the fluid catalyst used in combination with the fluid medium to the fluidized bed reactor;

a dispersing plate disposed at a lower part of the fluidized bed reactor, the dispersing plate configured to receive the mixed gas flowing upward from the gas supplying unit before the mixed gas is supplied to the fluid catalyst or the fluid catalyst used in combination with the fluid medium; and an ignition device disposed under the dispersing plate, wherein the mixed gas flows upwards through the dispersing plate and the ignition device is configured to heat the mixed gas until a temperature of the fluidized bed reactor has reached a combustion temperature of the mixed gas.

2. The device for producing nanocarbon according to claim 1, further comprising:

a gas refluxing path configured to reflux the unreacted low hydrocarbon included in the exhaust gas exhausted from the fluidized bed reactor so as to be supplied to the decomposition reaction.

3. The device for producing nanocarbon according to claim 2, further comprising:

a hydrogen separation unit configured to separate the hydrogen from the exhaust gas, wherein the gas refluxing path is connected to the hydrogen separation unit at a side for exhausting the exhaust gas separated from hydrogen.

4. The device for producing nanocarbon according to claim 3, further comprising:

a carbon dioxide separation unit configured to separate carbon dioxide at a downstream of the side for exhausting the exhaust gas separated from hydrogen of the hydrogen separation unit, wherein the gas refluxing path is connected to the carbon dioxide separation unit at a side for exhausting the exhaust gas separated from carbon dioxide.

5. The device for producing nanocarbon according to claim 4, further comprising:

a water separation unit configured to separate water at a downstream of a side for exhausting the exhaust gas separated from carbon dioxide of the carbon dioxide separation unit, wherein the gas refluxing path is connected to the water separation unit at a side for exhausting the exhaust gas separated from water.

6. The device for producing nanocarbon according to any one of claims 1-5, further comprising:

a second fluidized bed reactor at a second stage of the fluidized bed reactor, wherein the second fluidized bed reactor is configured to contain therein a fluid catalyst or a fluid catalyst used in combination with a fluid medium and is configured to cause therein the self-combustion by being supplied with the exhaust gas from the fluidized bed reactor and oxygen;

a second gas supplying unit connected to the second fluidized bed reactor and configured to supply the exhaust gas and oxygen to the second fluidized bed reactor;

a second exhaust gas path connected to the second fluidized bed reactor and configured to exhaust an exhaust gas in the second fluidized bed reactor to outside; and a second supplying unit connected to the second fluidized bed reactor and configured to supply the fluid catalyst or the fluid catalyst used in combination with the fluid medium to the second fluidized bed reactor.

7. The device for producing nanocarbon according to any one of claims 1-6, further comprising:

a screw feeder configured to transfer a mixture of:

one or two or more of the fluid catalyst or the fluid medium contained in the fluidized bed reactor;

a catalyst served to the decomposition reaction and including the nanocarbon; and a catalyst obtained by pretreating the catalyst served to the decomposition reaction and including the nanocarbon to remove at least the nanocarbon.

8. The device for producing nanocarbon according to any one of claims 1-7, comprising:

the fluidized bed reactor; and a screw feeder moving reaction bed for conducting the decomposition reaction while feeding the fluid catalyst.

* * * * *